(12) United States Patent
Tomaru et al.

(10) Patent No.: US 6,591,041 B2
(45) Date of Patent: Jul. 8, 2003

(54) OPTICAL FIBER COUPLER, MANUFACTURING METHOD AND APPARATUS THEREOF

(75) Inventors: Satoru Tomaru, Tokyo (JP); Osamu Kobayashi, Tokyo (JP); Takashi Uetake, Tokyo (JP)

(73) Assignee: NTT Advanced Technology Corporation, Tokyo (JP)

( * ) Notice: Subject to any disclaimer, the term of this patent is extended or adjusted under 35 U.S.C. 154(b) by 120 days.

(21) Appl. No.: 09/819,642

(22) Filed: Mar. 29, 2001

(65) Prior Publication Data

US 2002/0122631 A1 Sep. 5, 2002

(30) Foreign Application Priority Data

Mar. 2, 2001 (JP) ........................ 2001-058828

(51) Int. Cl.[7] ................................. G02B 6/26
(52) U.S. Cl. ........................................ 385/43
(58) Field of Search ...................... 385/40–43, 147, 385/96, 28, 37, 31, 39, 50, 46

(56) References Cited

U.S. PATENT DOCUMENTS 5,004,316 A * 4/1991 Hill et al. ..................... 385/43
5,054,874 A * 10/1991 Hill et al. ..................... 385/28
6,169,830 B1 * 1/2001 Kewitsch et al. ............. 385/37
6,236,782 B1 * 5/2001 Kewitsch et al. ............. 385/37

FOREIGN PATENT DOCUMENTS

| JP | 02171705 A | | 7/1990 | |
| JP | 02171705 A | * | 7/1990 | .................. 385/37 |
| JP | 02259704 A | | 10/1990 | |
| JP | 02259704 A | * | 10/1990 | .................. 385/37 |
| WO | WO 8700934 | | 2/1987 | |

* cited by examiner

Primary Examiner—Akm E. Ullah
(74) Attorney, Agent, or Firm—Finnegan, Henderson, Farabow, Garrett & Dunner, LLP

(57) ABSTRACT

An optical fiber coupler according to the present invention comprises two optical fibers which each include a core portion serving to propagate light and a clad portion surrounding said core portion, the two optical fibers extending substantially in parallel in a same flat plane, and a melting portion in which the clad portions of the two optical fibers are fused together substantially in a line contact. Two optical fibers are arranged in parallel to permit at least parts of the clad portions to be brought into contact with each other. In this state, the two optical fibers are heated and fused mutually substantially in a line contact and are further drawn for fabrication thereof. The optical fibers are heated preferably employing an electric ceramic microheater. The two optical fibers may be same or different in structural parameters.

20 Claims, 36 Drawing Sheets

US 6,591,041 B2

OPTICAL FIBER COUPLER, MANUFACTURING METHOD AND APPARATUS THEREOF

This application is based on Patent Application No. 2001-58828 filed Mar. 2, 2001 in Japan, the content of which is incorporated hereinto by reference.

BACKGROUND OF THE INVENTION

1. Field of the Invention

The present invention relates to a wide-bandwidth optical fiber coupler with less polarization dependency loss and less excessive loss, and a method and an apparatus for easily and stably fabricating the optical fiber coupler.

2. Description of the Related Art

An optical coupler with less wavelength dependency, e.g. a wide-bandwidth optical fiber coupler for branching and coupling a wide-bandwidth optical signal may enjoy wide utilization as various optical parts for use in general optical fields and micro optical fields and in optical communication and optical data processing.

Upon fabrication of such a wide-bandwidth optical fiber coupler, there is known a prior art method wherein one of two optical fibers possessing the same structural parameters of the optical fibers is previously heated and drawn to force the structural parameters of these two optical fibers to be different or two optical fibers possessing mutually different structural parameters of the optical fibers are used, melted and drawn in a twisted state of the fibers.

Referring to FIGS. 29 to 31, fabrication procedures of such a prior art wide-bandwidth optical fiber coupler is illustrated in schematically. Opposite ends of one optical fiber 1 is held on a pair of carrying blocks 2. A coating is removed from a central portion of the optical fibers 1 located between these carrying blocks 2 as illustrated in FIG. 29. A distance between the pair of the carrying blocks 2 is increased while heating an exposed optical fiber strand 3. The portion of the optical fiber strand 3 is preliminarily drawn, as illustrated in FIG. 30. There are twisted a preliminarily drawn optical fiber 5 and the optical fiber 1 which optical fiber 1 is not preliminarily drawn and in which a coating thereof is only removed from a central portion thereof are twisted along that portions of the optical fiber strands. In this state, both ends of these optical fibers 1 and 5 are again held on the pair of the carrying blocks 2. The distance between the pair of the carrying blocks 2 are increased while again heating the portions of the twisted optical fiber strands 3 with the burner 4, as illustrated in FIG. 31. The two optical fiber strands 3 are hereby melted and drawn at those twisted portions to obtain such an optical fiber coupler 6 as illustrated in FIG. 32.

When a wide-bandwidth optical fiber coupler 6 with reduced wavelength dependency is fabricated, the foregoing prior art method where there are used two optical fibers with mutually different structural parameters requires that two kinds of optical fibers previously should be fabricated. This is not general in view of the production cost.

To solve this difficulty, the following method is exclusively employed: two optical fibers of the same kind are prepared, one of which is preliminarily drawn to change the parameters concerning the structure.

The prior art method illustrated in FIGS. 29 to 31, however, needs to preliminarily draw the optical fiber strand 3 by about 10 mm using the burner 4. In the method, it is essentially impossible to finely control heating temperature for the optical fiber strand 3 in the unit of several tens of ° C. for example so as to prevent a wire diameter from being varied. In the prior art method, the wire diameter of a portion of the preliminarily drawn optical fiber strand 3 is narrowed, so that it is necessary to mutually twist the preliminarily drawn optical fiber strand 3 and the optical fiber strand 3 of the optical fiber 1 from which sheath is only simply removed for securely bringing them into close contact. As illustrated in FIG. 23, when the two optical fibers 1 and 5 are mutually twisted, it is necessary to apply tension uniformly to those two optical fibers 1 and 5, so that those fibers should be twisted with subtle discretion. The prior art method therefore suffers from difficulty that work is complicated with deteriorated reproducibility. The prior art method further suffers from a difficulty that the optical fibers 1 and 5 are subjected to twisting, so that the optical fiber strand 3 suffers from larger polarization dependency owing to internal stress produced in itself, and allows polarization dependency loss (hereinafter, may be simply referred to PDL.) to be increased together with increased excessive loss.

Referring to FIG. 33, there is illustrated wavelength dependency of a coupling ratio, i.e. a branch ratio between a symmetrical optical fiber coupler A where an optical coupling portion is configured symmetrically and asymmetrical wide band optical fiber couplers B and C where an optical coupling portion is not symmetrical). For such a branch ratio of a general symmetrical optical fiber coupler in which parameters concerning the structures of two optical fibers constituting an optical fiber coupler A are same for each other, it varies periodically from 0 to 100% owing to the wavelength of an optical signal. In contrast, for wide band optical fiber couplers B and C possessing different parameters concerning the structures of two optical fibers constituting an optical coupling portion, a branch ratio is reduced to a specific value, 100% or less by combining optical fibers with outer diameters of clad portions thereof for example being respectively 115 µm and 125 µm. There is thereupon utilized a flat portion located in the vicinity of the maximum of the just-mentioned branch ratio. As illustrated in FIG. 33, the wide-bandwidth optical fiber coupler B has the branch ratio of 50% at wavelength of 1.4 µm and the wide-bandwidth optical fiber coupler C has the optical branch ratio of 20% at wavelength of 1.4 µm. It can be understood therefrom that a change in the branch ratio in the vicinity of the maximum branch ratio is more flattened than the wavelength characteristic of the symmetrical optical fiber coupler A would be.

For fabricating the aforementioned wide-bandwidth optical fiber coupler there is known a method proposed by International Application PCT/GB 86/00445. More specifically, one single mode optical fiber is preliminarily drawn, and the preliminarily drawn optical fiber and another optical fiber not preliminarily drawn are combined, melted and drawn to successfully obtain a wide-bandwidth optical fiber coupler 6 as illustrated in FIG. 34 and FIG. 35 which illustrates a cross sectional structure viewed along XXXV—XXXV shown in FIG. 34. In the resulting optical fiber coupler 6, a propagation constant of the one single mode optical fiber 1 is altered with the aid of preliminary drawing to obtain different parameters from those concerning the structure of the optical fiber 5 not preliminarily drawn with the maximum branch ratio brought into a specific value less than 100%, and a flat wavelength characteristic in the vicinity of the maximum value of the branch ratio is utilized. In FIG. 34, designated at 7a is a core portion, 7b is a clad portion, 8 is preliminarily drawn portion, and 9 is a melted drawn portion.

The aforementioned prior art fabrication method for the wide-bandwidth optical fiber coupler 6 using the preliminary drawing, however, has a difficulty that uniform preliminary drawing is difficult. More specifically, uniform heating control for the preliminary drawn portion 8 is difficult to make impossible precision configuration control and hence to make it difficult to obtain a uniform outer diameter of the melted drawn portion 9. The optical fibers 1 and 5 might thereupon been sometimes bent upon processing the resulting wide-bandwidth optical fiber coupler 6. This might cause set value control for the branch ratio to be difficult and therefore accuracy of flatness of the branch ratio of the drawn optical fiber to be unsatisfactory with the very bad yield of the coupler.

To solve the aforementioned difficulty with the preliminary drawing described above, Japanese Patent Application Laid-Open No. 2-171705 discloses a method wherein two optical fibers possessing mutually different propagation constants are drawn with the mutually equal drawing, and are then melted and further drawn. Further, Japanese Patent Application Laid-Open No. 2-259704 discloses another method wherein between two single mode optical fibers including clad portions thereof having mutually different diameters thereof the one optical fiber having the same outer diameter as that of the same optical fiber at the other end is previously melted and connected with both ends of the other optical fiber, and then the two optical fibers are melted and drawn.

Also in these two methods, however, structural parameters of the two optical fibers are made asymmetrical and the maximum value of the branch ratio is brought to a specific value less than 100%, and wavelength flatness in the vicinity of the maximum value is utilized. The degree of melting is still high so as to provide close coupling.

When two optical fibers having the same structural parameters are mutually melted and drawn to fabricate a symmetrical optical fiber coupler, the maximum value of the branch ratio thereof becomes 100% as illustrated in FIG. 33. Thereupon, it is contemplated from the viewpoint of the neighborhood of the maximum value of the branch ratio being used that a wide-bandwidth optical fiber coupler having an arbitrary branch ratio can not been fabricated. Accordingly, a wide-bandwidth optical fiber coupler is conventionally fabricated by preparing two optical fibers having mutually different structural parameters such as a diameter of a clad portion or combining a preliminary drawn optical fiber and a not preliminarily drawn optical fiber.

In optical fiber communication, there are required wide-bandwidth optical fiber couplers possessing various branch ratios not only of 50% but also of 20, 10, 5, 2%, etc. Further, each time a branch ratio is altered, there must be prepared optical fibers having different structural parameters such as a core diameter, a specific refractive index, and a clad outer diameter, resulting in the high fabrication cost. When a wide-bandwidth optical fiber coupler fabricated with a different clad diameter optical fiber is assembled in an optical communication network, it is necessary to connect a different clad diameter optical fiber with opposite ends of the assembled optical fiber. It is generally not easy technically to connect optical fibers possessing different parameters concerning such a structure mutually in series, resulting in the costing-up of fiber fabrication.

SUMMARY OF THE INVENTION

In view of the above description it is an object of the present invention to provide a method and an apparatus capable of easily fabricating with excellent reproduction a wide-bandwidth optical fiber coupler that possesses less polarization dependency loss and less excessive loss.

It is another object of the present invention to provide an optical fiber coupler that eliminates a preliminary drawing process, and a method capable of inexpensively fabricating the foregoing optical fiber coupler.

A first aspect of the present invention is an optical fiber coupler which comprises two optical fibers each including a core section for serving to transmit light and a clad section surrounding the former core section, the two optical fibers extending substantially parallel in a same flat plane, and a melting section where the clad sections of the two optical fibers are mutually melted substantially in a line contact state.

The present invention is grounded on the appreciation that the wavelength dependency of the branch ratio of the optical fiber coupler with low melting rate tends to become less than that of the branch ratio of the optical fiber coupler with high melting rate, as shown in FIG. 36.

In the optical fiber coupler according to the first aspect of the present invention, outer diameters of clad portions of two optical fiber couplers may be substantially equal to each other. In this case, even if a coupling rate of the optical fiber coupler is 100%, the optical fiber coupler with arbitrary branch ratio can be provided by making use of a portion with a mild modulation of the branch ratio.

It is advantageous that the branch ratio of the optical fiber coupler increases substantially monotonically in response to the wavelength of light that propagates in an optical fiber, and in the wavelength range of the light of from 1.3 $\mu$m to 1.55 $\mu$m the amount of a change in the branch ratio effectively lies within 20%.

In accordance with the first aspect of the present invention, in the wavelength range of light of from 1.3 $\mu$m to 1.55 $\mu$m the branch ratio of the optical fiber coupler may be 1 to 20%.

Outer diameters of clad portions of two optical fibers may be mutually different.

It is preferable that when the size of the maximum width size of the melting portion is assumed to be W, and outer diameters of the clad portions of the two optical fibers in the melting portion are assumed $d_1$ and $d_2$ respectively, a melting rate C represented by $$C=[1-\{W/(d_1+d_2)\}]\times 100$$

lies in the range of from 0.5 to 10%, preferably 1 to 7% which range corresponds to "substantially line contact state" in the present invention.

A second aspect of the present invention is a method for fabricating an optical fiber coupler which comprises the steps of arranging mutually in parallel two optical fibers each including a core portion serving to propagate light therethrough and a clad portion surrounding the core portion to bring at least parts of the clad portions into close contact, melting mutually parts of the clad portions of the two optical fibers substantially in a line contact state by heating these clad portions in a mutual close contact state of at least parts of the clad portions, and heating and drawing the mutually melted two optical fibers.

In the method for fabricating the optical fiber coupler according to the present invention, the step of mutually melting the clad portions of the two optical fibers may include a step of heating the clad portions to 1500° C. or higher.

The step of heating and drawing of the two optical fibers mutually melted may further comprise the steps of lowering heating temperature with respect to the two optical fibers after those optical fibers are melted, drawing melted portions of the two optical fibers in the state where the heating temperature is lowered, forcing monitor light to impinge from a one end side of any of the two optical fibers and detecting the monitor light from the other end side of at least one of the two optical fibers to measure a branch ratio thereof, and interrupting the drawing of the melted portions of the two optical fibers at the time when the branch ratio reaches a predetermined value. Therefore, an optical fiber coupler having a desired branch ratio can be obtained.

It is preferable that when the size of the maximum width size of the melting portion is assumed to be W, and outer diameters of the clad portions of the two optical fibers in the melting portion are assumed $d_1$ and $d_2$ respectively, a melting rate C represented by $$C=[1-\{W/(d_1+d_2)\}]\times 100$$

lies in the range of from 0.5 to 10%, preferably 1 to 7% which range corresponds to "substantially line contact state" in the present invention. Therefore, the optical fiber coupler possessing excellent characteristic can be obtained.

For the heating for the optical fiber an electric ceramic microheater may be preferably employed in view of the ease of temperature control. It is then ensured that heating temperature for the optical fiber becomes accurately controllable to smoothly change the diameter of the optical fiber strand as well as successfully obtain a long drawn region possessing a uniform wire diameter. This assures fabrication of an optical fiber coupler possessing excellent characteristics. It is additionally possible to preliminarily draw, in the state where two optical fibers are previously arranged in parallel very closely, only the one optical fiber.

There may be substantially equal outer diameters of the clad portions of the two optical fibers where at least parts of the clad portions are brought into contact with each other.

The two optical fibers where at least parts of the clad portions are brought into contact with each other may be different from each other in their structural parameters. Therefore, it becomes possible to melt such two optical fibers without twisting them, whereby a high quality wide-bandwidth optical fiber coupler with less PDL and less excessive loss is ensured stably.

In this case, it is possible to further provide a step in which only one of the two optical fibers are preliminarily drawn to bring structural parameters thereof to different ones. Therefore, melting of two optical fibers is ensured without twisting them, and a high quality wide-bandwidth optical fiber coupler with less PDL and less excessive loss is ensured stably at the low cost.

The method for fabricating an optical fiber coupler may further comprise the steps of arranging mutually in parallel two optical fibers having the same structural parameter, and preliminarily drawing only one of the two optical fibers to provide mutually different structural parameters thereof. Therefore, melting of two optical fibers is ensured without twisting them, and a high quality wide-bandwidth optical fiber coupler with less PDL and less excessive loss is ensured stably at the low cost.

In this case, the step of preliminarily drawing one optical fiber may include the steps of heating both the two optical fibers to distortion eliminating temperature or higher, and drawing only one of the heated two optical fibers. Otherwise, the same step may be performed at a heating temperature where one optical fiber does not melt with the other optical fiber. Therefore, it becomes possible to previously hold the two optical fibers closely and hence improve workability whereby an optical fiber coupler effectively ensured.

A third aspect of the present invention is an apparatus for fabricating an optical fiber coupler which comprises a pair of fiber carrying blocks for holding longitudinal opposite sides of two optical fibers possessing mutually different structural parameters, fiber fixing means provided on the fiber carrying blocks for fixing the two optical fibers to the fiber carrying blocks, a base for carrying the pair of the fiber carrying blocks movably longitudinally of the optical fibers, carrying block drive means for moving the pair of the fiber carrying blocks mutually oppositely in the opposite directions of the fiber carrying blocks, fiber forcing means provided on the fiber carrying blocks for forcing the two optical fibers such that parts of portions of the optical fibers from which coatings of the two optical fibers are removed and brought into contact with each other, and a heater mounted on the base movably in the direction intersecting the longitudinal direction of the two fibers along a flat plane containing the two optical fibers for heating the two optical fibers.

In accordance with the third aspect of the present invention, melting of two optical fibers is ensured without twisting them, and a high quality wide-bandwidth optical fiber coupler with less PDL and less excessive loss is ensured stably at the low cost.

A fourth aspect of the present invention is an apparatus for fabricating an optical fiber coupler which comprises a pair of first fiber carrying blocks for holding longitudinal opposite sides of a first optical fiber, first fiber fixing means provided on the pair of the first fiber carrying blocks to fix the first optical fiber to the fiber carrying blocks, a pair of second fiber carrying blocks for holding a second optical fiber at longitudinal opposite sides thereof in parallel with the first optical fiber, second fiber fixing means provided on the pair of the second fiber carrying blocks for fixing the second optical fiber to the second fiber carrying blocks, a base for movably carrying the first and second fiber carrying blocks longitudinally of the optical fiber, first carrying block drive means for mutually oppositely moving the pair of the first fiber carrying blocks in opposite direction thereof, second carrying block drive means for mutually oppositely moving the pair of the first fiber carrying blocks in the opposite direction thereof, fiber biasing means provided on the first and second fiber carrying blocks for biasing the first and second optical fibers such that parts of portions of the first and second optical fibers where coatings thereof are removed make contact with each other, a heater mounted movably in a direction intersecting a longitudinal direction of the optical fibers along a flat plane containing the first and second optical fibers for heating the first and second optical fibers, and heater movement means for driving the heating means in the direction intersecting the longitudinal direction of these optical fibers along a flat plane containing the first and second optical fibers.

In accordance with the fourth aspect of the present invention, melting of two optical fibers is ensured without twisting them, and a high quality wide-bandwidth optical fiber coupler with less PDL and less excessive loss is ensured stably at the low cost.

In the apparatus for fabricating an optical fiber coupler according to the third or fourth aspect of the present invention, there can be further provided a pair of coupling means for respectively integrally coupling first and second fiber carrying blocks located mutually closely. Therefore, when two optical fibers are heated, melted, and drawn, it becomes possible to securely integrally move them.

The fiber forcing means may include a fixing pin fixed to any one of the first and second fiber carrying blocks, a plunger disposed oppositely to the fixing pin between the first and second optical fibers and being movable oppositely to the fixing pin, and plunger fixing means for fixing the plunger at a predetermined position oppositely to the fixing pin. Therefore, melting of two optical fibers is ensured without twisting them, and a high quality wide-bandwidth optical fiber coupler with less PDL and less excessive loss is ensured stably at the low cost.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Although in the following embodiments of the present invention will be described with reference to FIGS. 1 to 28, the present invention is not limited to such embodiments, and there are possible further partial combinations and proper partial alteration at need.

Figure 1:
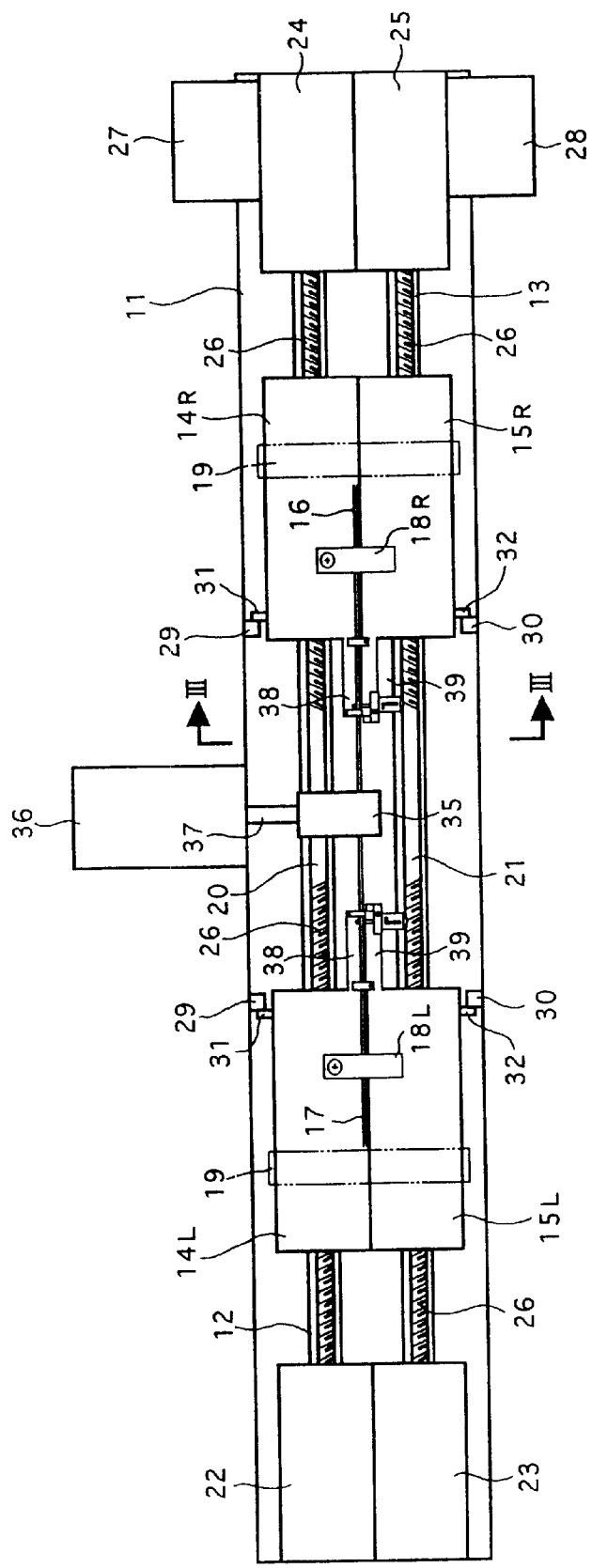
FIG. 1 is a front view illustrating an external appearance of an embodiment of an apparatus for fabricating an optical fiber coupler according to the present invention.
Figure 2:
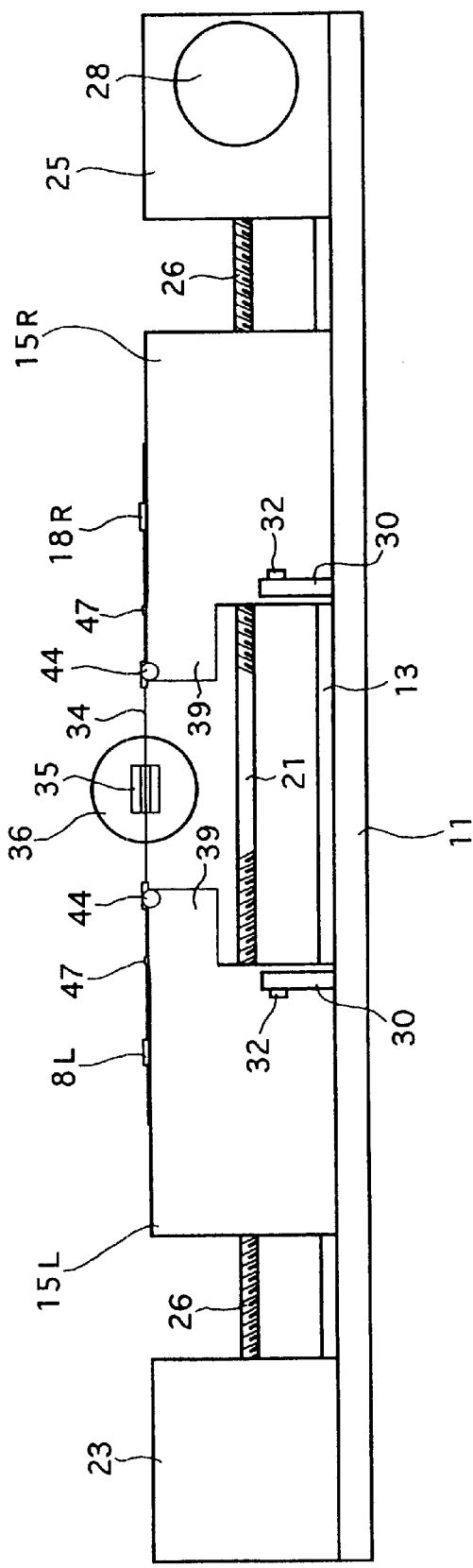
FIG. 2 is a plan view of the embodiment of FIG. 1.
Figure 3:
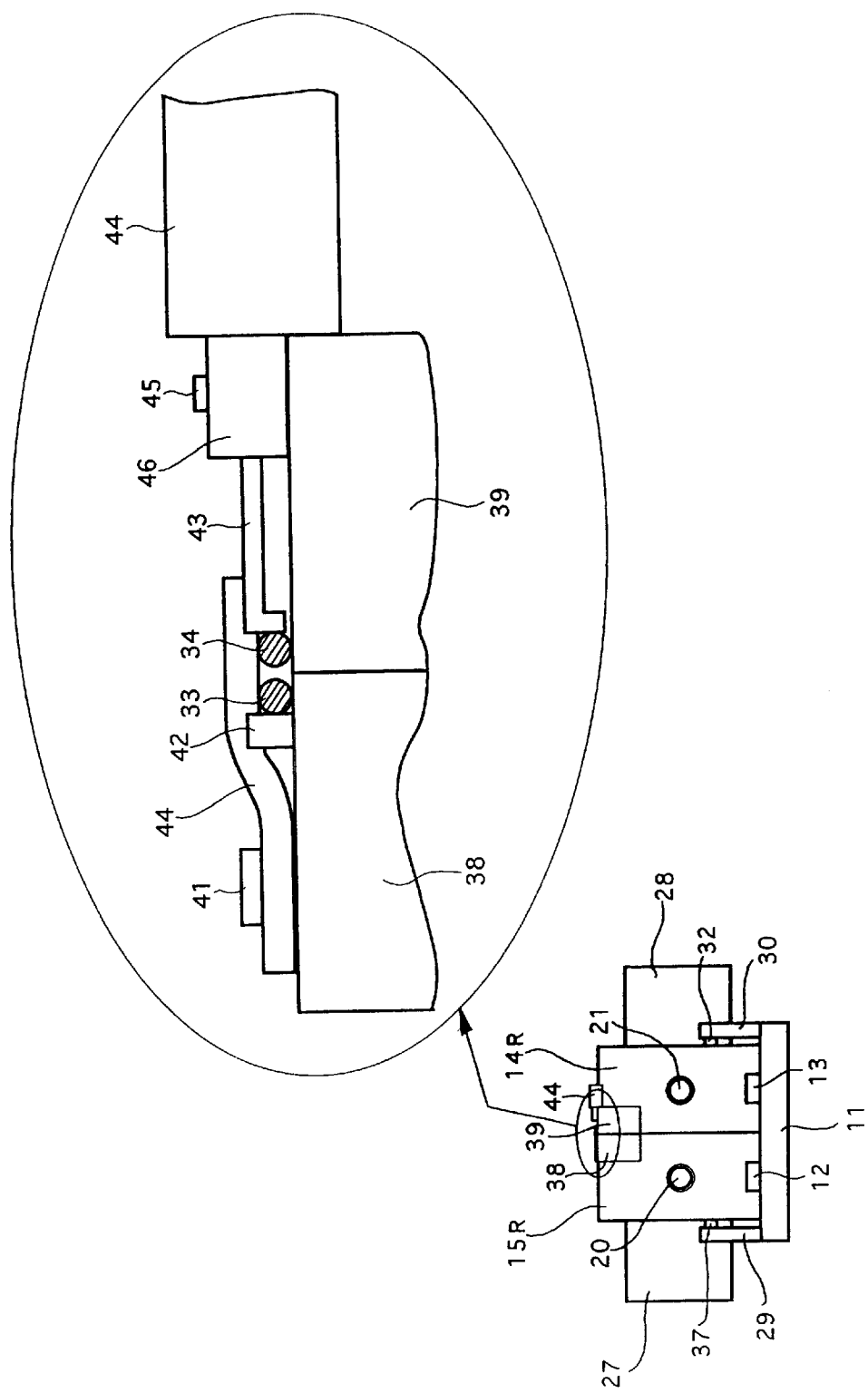
FIG. 3 is a cross sectional view viewed along a line III—III in FIG. 1.
Figure 4:
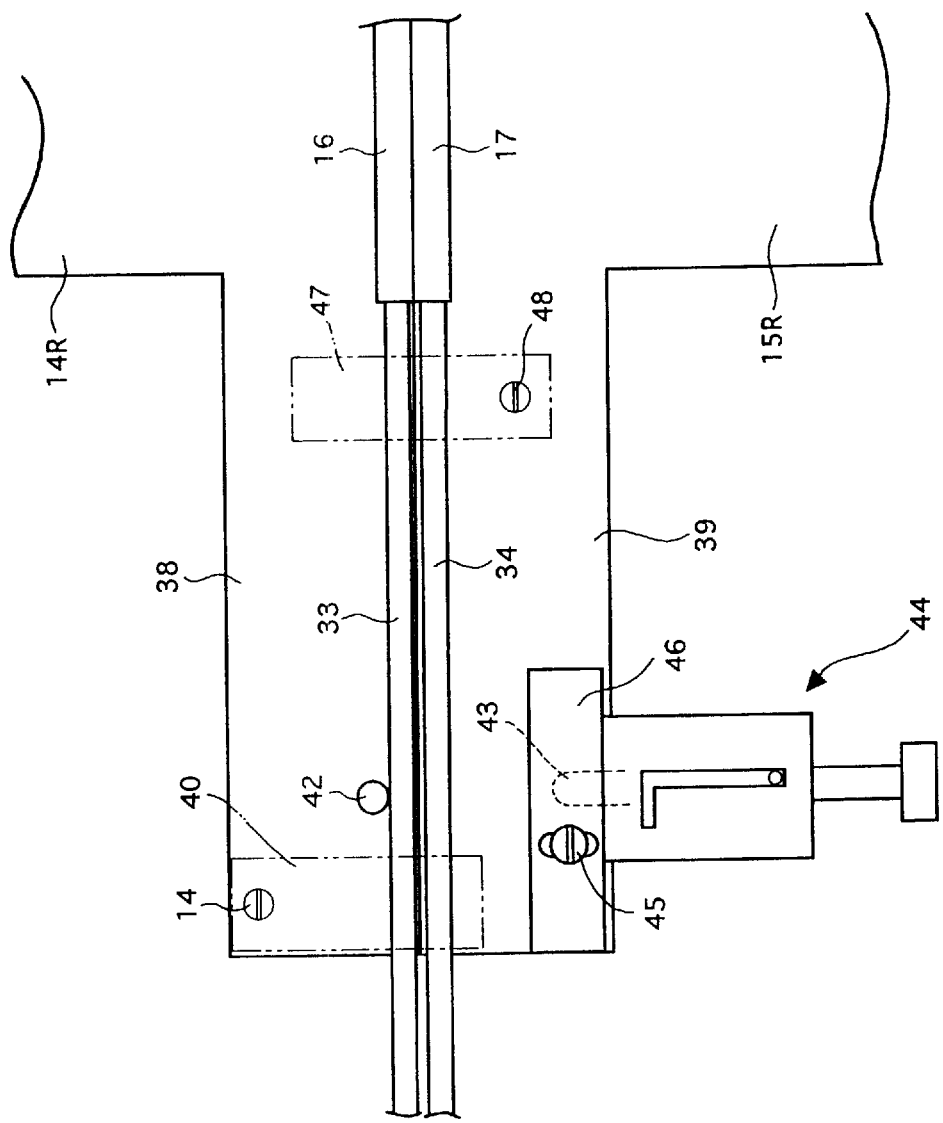
FIG. 4 is an enlarged view obtained by extracting part of a strand-fixing portion in FIG. 1.

FIG. 1 illustrates an apparatus for fabricating an optical fiber coupler according to the present invention in a flat plane configuration thereof, FIG. 2 illustrates a front surface configuration thereof, FIG. 3 is a cross sectional configuration partly enlarged and viewed along a line III—III in FIG. 1, and FIG. 4 illustrates an extracted and enlarged configuration of a portion of an strand fixing section in FIG. 1. Two rails 12 and 13 extending mutually in parallel are laid on a base 11. Two sets of fiber carrying blocks 14L, 14R, 15L and 15R are respectively slidably engaged with these two rails 12 and 13. A pair of first fiber carrying blocks 14L and 14R (upper side in FIG. 1) that slide on the one rail 12 and a pair of first fiber carrying blocks 15L and 15R (lower side in FIG. 1) that slide on the other rail 13 have fundamentally the same structure. Opposite sides of the portion of each of the optical fibers 16 and 17 are hereby held. In the present embodiment, base ends of flexible fiber clamping plates 18L and 18R for holding the optical fibers 16 and 17 at tip ends thereof are screwed to the second fiber carrying blocks 15L and 15R (hereinafter sometimes simply referred to as 15). The one optical fiber 16 placed on the first fiber carrying blocks 14L and 14R (hereinafter sometimes simply referred to as 14) and the other optical fiber 17 placed on the second fiber carrying block 15 can be held mutually substantially in parallel in the state where these coatings of the fibers are brought into close contact by making use of spring forces of these fiber clamping plates 18L and 18R. The force for holding the optical fibers 16 and 17 by making use of the fiber clamping plates 18L and 18R is not needed to be so large. The force may be enough simply prevented the fibers 16 and 17 from falling from the fiber carrying blocks 14 and 15. As illustrated in FIG. 1, the left side first fiber carrying block 14L and the second fiber carrying block 15L, and the right side first fiber carrying block 14R and the second fiber carrying block 15R can be mutually integrally coupled in an arbitrary position relation using demountable coupling metal fittings 19. For such a coupling metal fittings 19 use may be suitably made of those utilizing a leaf spring and magnetic force.

Two feed screws 20 and 21 extending in parallel with the rails 12 and 13 are disposed above the rails 12 and 13 so as to penetrate the aforementioned fiber carrying blocks 14 and 15. One end sides of these feed screws 20 and 21 are born rotatably with respect to two bearing brackets 22 and 23 disposed on the base 11, while the other end sides are born rotatably with respect to two gearboxes 24 and 25 disposed likely on the base 11. On the respective feed screw shafts 20 and 21, there are formed male screws 26, directed oppositely on the one end side and on the other end side thereof with the central portion thereof taken as a boundary, which male screws are in a threaded state with respect to feed nuts (not shown) fixed to the fiber carrying blocks 14 and 15. Stepping motors 27 and 28 are mounted on the respective gearboxes 24 and 25 for rotating the feed screw shafts 20 and 21. The respective stepping motors 27 and 28 and the feed screw shafts 20 and 21 are coupled with each other through reduction gear mechanisms (not shown) assembled in the gearboxes 24 and 25.

Thus, as the stepping motors 27 and 28 are rotated in one direction or the reverse direction, the feed screw shafts 20 and 21 are correspondingly positively or negatively rotated, whereby a pair of the opposing fiber carrying blocks 14 and 15 move along the rails 12 and 13 such that they close or leave each other. The amount of movement of these fiber carrying blocks 14 and 15 is specified by the number of drive pulses to the stepping motors 27 and 28.

In the preferred embodiment, four locating blocks 29 and 30 are protruded on the base 11 for specifying the home position of the pair of the fiber carrying blocks 14 and 15. Stoppers 31 and 32 capable of being contact with these locating blocks 29 and 30 are protruded on the side surfaces of the respective fiber carrying blocks 14 and 15. More specifically, the fiber carrying blocks 14L, 15L or 14R, 15R are obstructed in their movement from the state where the stoppers 31 and 32 for the fiber carrying blocks are at a home position as illustrated in FIG. 1 where they simultaneously make contact with the corresponding locating blocks 29 and 30 to the side of the other fiber carrying blocks 14R, 15R or 14L, 15L. The left side fiber carrying blocks 14L, 15L and the right side fiber carrying blocks 14R, 15R may be moved such that they are mutually separated taking the home position as a fiducial position.

Figure 6:
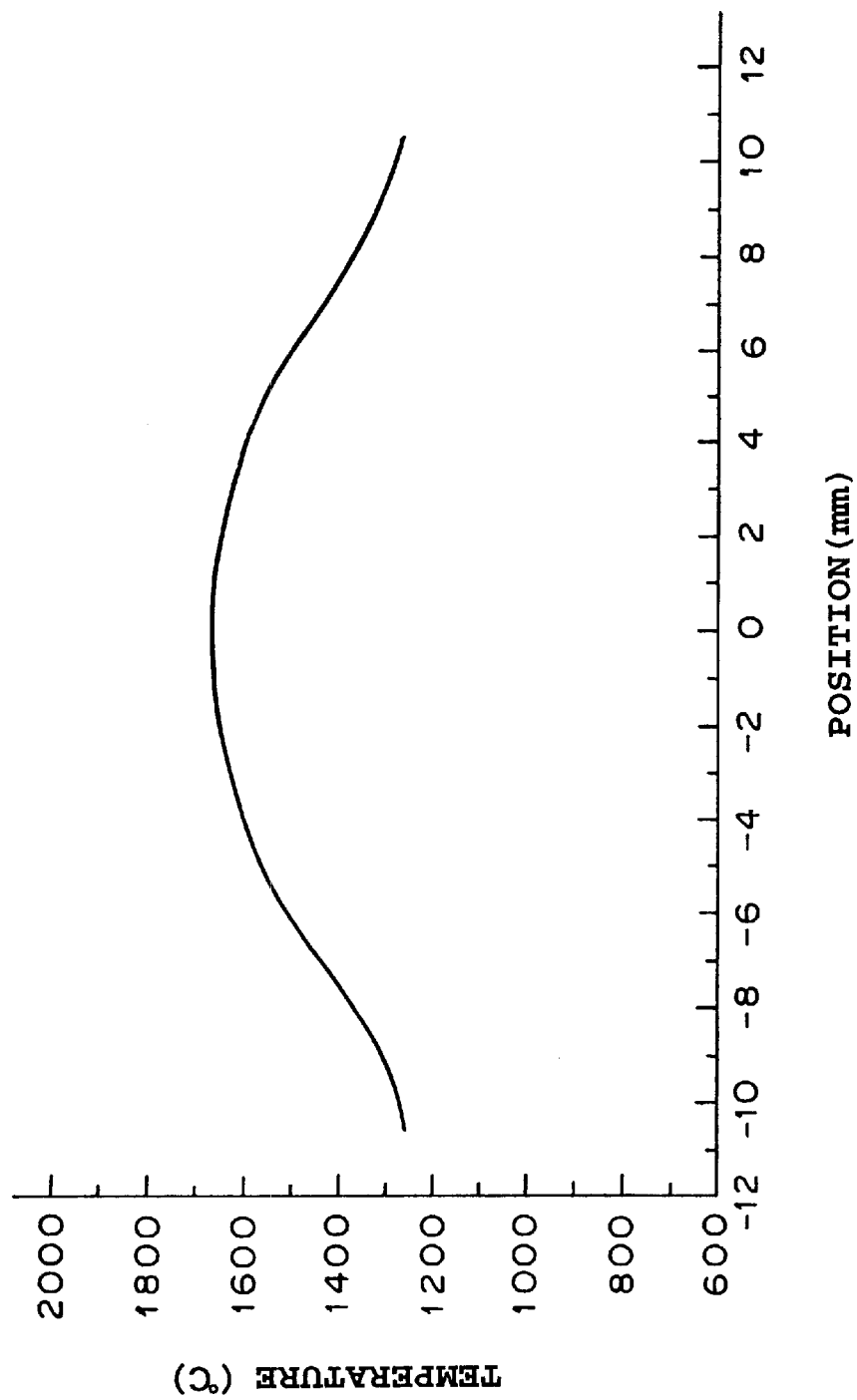
FIG. 6 is a graph illustrating a heating temperature characteristic of a heater in the present embodiment.

Referring to FIG. 1, a heater 35 is disposed between the left side fiber carrying blocks 14L, 15L and the right side fiber carrying blocks 14R, 15R for heating the optical fiber strands 33 and 34 trained between these carrying blocks. The heater 35 in the present embodiment is an electric ceramic microheater capable of easy and precise temperature control, which has a channel-like configuration and provides there-inside such temperature distribution as illustrated in FIG. 6. It is therefore possible to set an about 10 mm wide region to be heated to 1350° C. or higher centered at the neighborhood of the center of such a recessed portion of the configuration of the ceramic microheater as that of the channel member by keeping the temperature of the neighborhood of the center of the recessed portion at about 1550° C. Electric power is supplied to the heater 35 from a power supply (not shown) such that upon preliminary drawing the one optical fiber 16 is located in the neighborhood of a channel part in the heater 35 and is heated while upon melting and drawing center portions of the two optical fiber strands 33 and 34 kept in a close contact are located in the neighborhood of the center of the channel in the heater 35 and are heated. A controller (not shown) controls the amount of supply of electric power from a power supply and the movement of the pair of the fiber carrying blocks 14 and 15. In a melting and drawing process, a laser diode having excitation wavelength of 1.55 $\mu$m for example is connected with one end of any one of the optical fibers 16 and 17 as a monitor light source, to the other ends of which optical fibers 16 and 17 an optical detection sensors are connected. The two optical detector sensors detect the monitor light emitted from the monitor light source to obtain a branch ratio changing during drawing in real time and hence to interrupt the heating and drawing when a desired branch ratio is attained.

The heater 35 is supported on a heater movement apparatus 36 mounted on the base 11 through a bracket (not shown). The heater movement apparatus 36 includes a plunger 37 capable of reciprocation traversing the two optical fiber strands 33 and 34. The heater 35 is coupled with the tip end of the plunger 37. The heater 35 mounted on the plunger 37 ensures heating a longitudinal central portion of the optical fiber strand 33 exposed by removing the coating on the one optical fiber 16 supported on the first optical fiber 16 for preliminary drawing, and heating and melting the longitudinal central portions of the two optical fiber strands 33 and 34 simultaneously for further drawing. Subtle temperature control in the unit of several tens of ° C. is ensured by controlling the amount of supply of electric power by the controller.

Elementary wire fixing sections 38 and 39 for mounting forcing means according to the present invention are integrally formed, protruded on the opposite sides of a pair of fiber carrying blocks 14 and 15. A flexible strand fixing plate 40 is screwed removably through a screw 41 to the tip end of the strand fixing section 38 of the first fiber carrying block 14 for integrally fix the optical fiber strand 33 from which the coating is removed integrally with respect to the strand fixing section 38. Spring force of the strand fixing plate 40 is employed to integrally fix the one optical fiber strand 33 to the strand fixing portion 38 of the first fiber carrying block 14 and move the aforementioned heater 35 to a predetermined position for its preliminary drawing.

Figure 5:
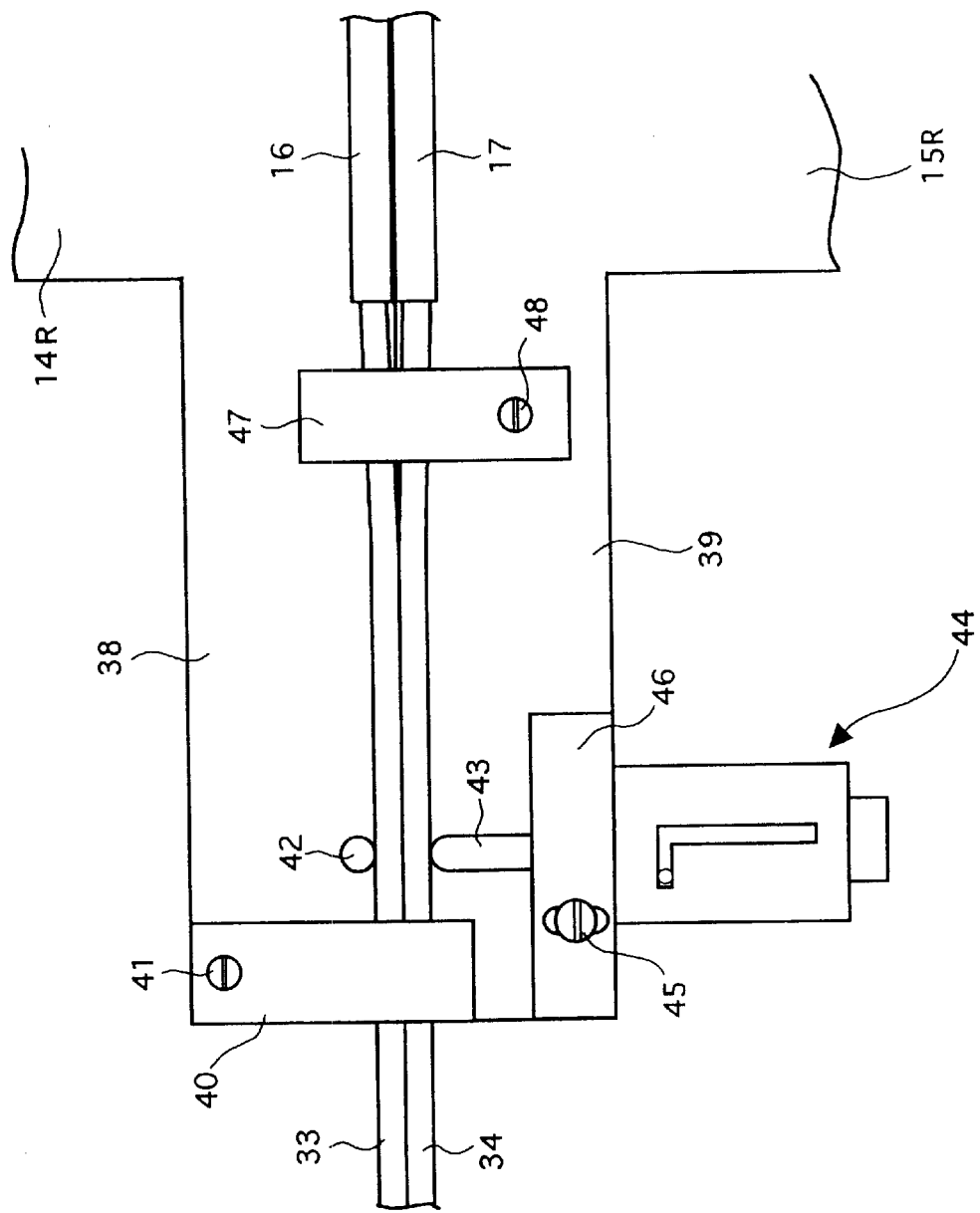
FIG. 5 is an enlarged view corresponding to FIG. 4 in the state where forcing means is operated to bring the optical fiber strands to contact with each other.

A receiving pin 42 is provided on the strand fixing section 38 of the first fiber carrying block 14, with which pin there can be made contact with the side end of the optical fiber strand 33 which is an exposed state of the optical fiber 16 placed on the first fiber carrying block 14 by removing the coating on the optical fiber 16 from the center of the same. A pressure rod 43 is fitted slidably to a rod operation member 44 mounted on the strand fixing section 39 of the second fiber carrying block 15, which pressure rod 43 has its tip end opposing to the aforementioned receiving pin 42 putting therein the optical fiber strand 34 becoming an exposed state by removing the coating from the center of the optical fiber 17 placed on the second fiber carrying block 15 and the optical fiber strand 33 of the first fiber carrying block 14. The pressure rod 43 can be changed over between a retreat position where the tip end is retreated to the bracket side described later as illustrated in FIG. 4 and an advance position where the two optical fiber strands 33 and 34 are put in a contact with the tip end portion and the receiving pin 42 as illustrated in FIG. 5. It is noticed that in the present embodiment the receiving pin 42, pressure rod 43, and rod-operating member 44 serve as the forcing means.

The rod operating member 44 is mounted on the bracket 46 fixed to the strand fixing section 39 of the second fiber carrying block 15 through the adjusting screw 45. The bracket 46 is finely adjustable in its position in a parallel direction to that of the sliding of the pressure rod 43 for the strand fixing section 39 of the second fiber carrying block 15 in response to the diameters of the optical fiber strands 33 and 34. Further, to the base end of the strand fixing section 39 of the second fiber carrying block 15 there is screwed removably through the screw 48 the flexible strand fixing plate 47 that serves to integrally fix the optical fiber strand 34 from which the coating has been removed to the strand fixing section 39. The spring force of the strand fixing plate 47 is used to integrally fix the other optical fiber strand 34 to the strand fixing section 39 of the second fiber carrying block 15 and move the aforementioned heater 35 to a predetermined position whereby the two optical fiber strands 33 and 34 are simultaneously heated and melted and are integrally successfully drawn.

Although in the aforementioned embodiment the two fiber carrying blocks 14 and 15 can be assumed to be independently driven, provided the first fiber carrying block 14L and the second fiber carrying block 15L both located on the left side and the first fiber carrying block 14R and the second fiber carrying block 15R both located on the right side can be securely integrated using a coupling fittings 19 as illustrated in FIG. 1, there may be eliminated the feed screw shaft 21, gear box 25, and stepping motor 28 arranged ion the side of the second fiber carrying block 15, and the driving mechanism may simplified.

Figure 7:
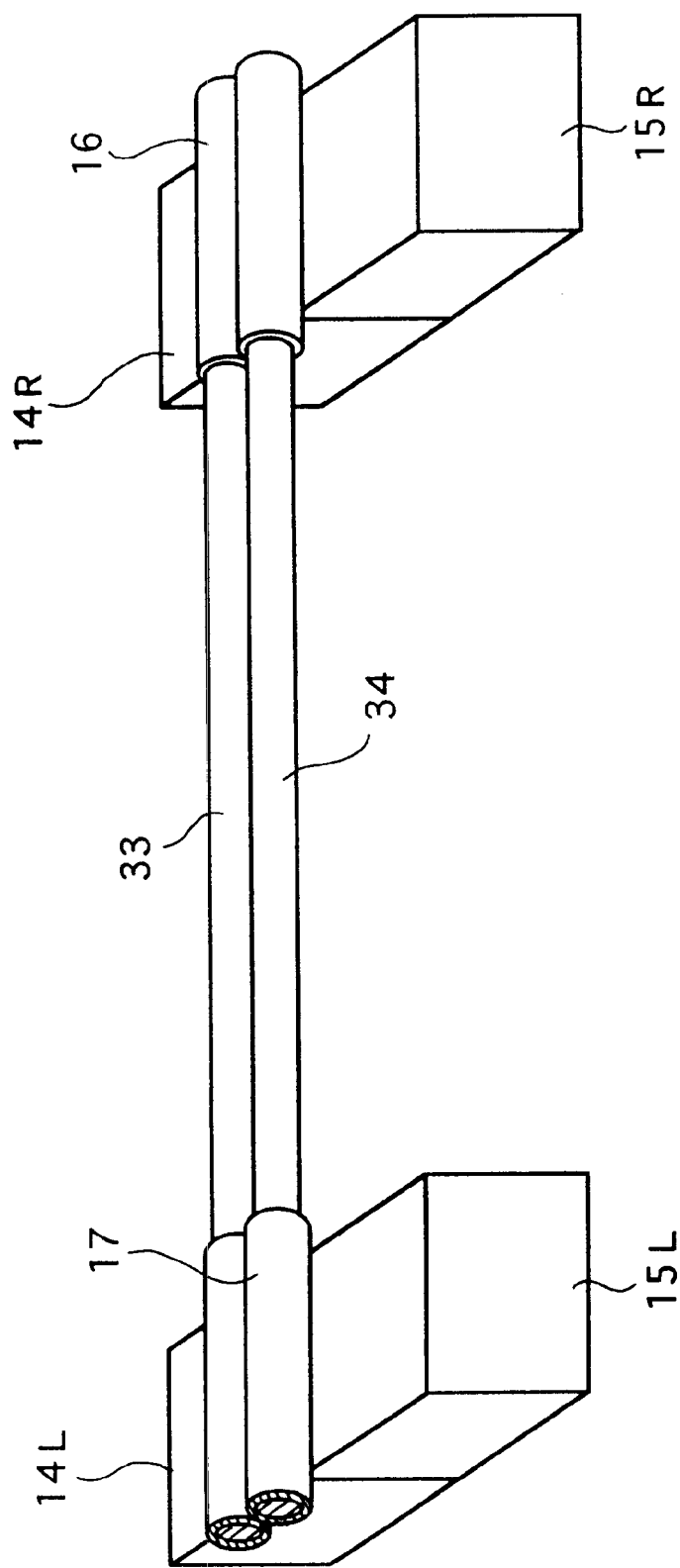
FIG. 7 is a view of a working concept illustrating procedures of fabrication of the optical fiber coupler according to the present embodiment together with FIGS. 8, 9, 11, 12, 14, 16, and 17, in which there are arranged two optical fibers mutually in parallel.
Figure 8:
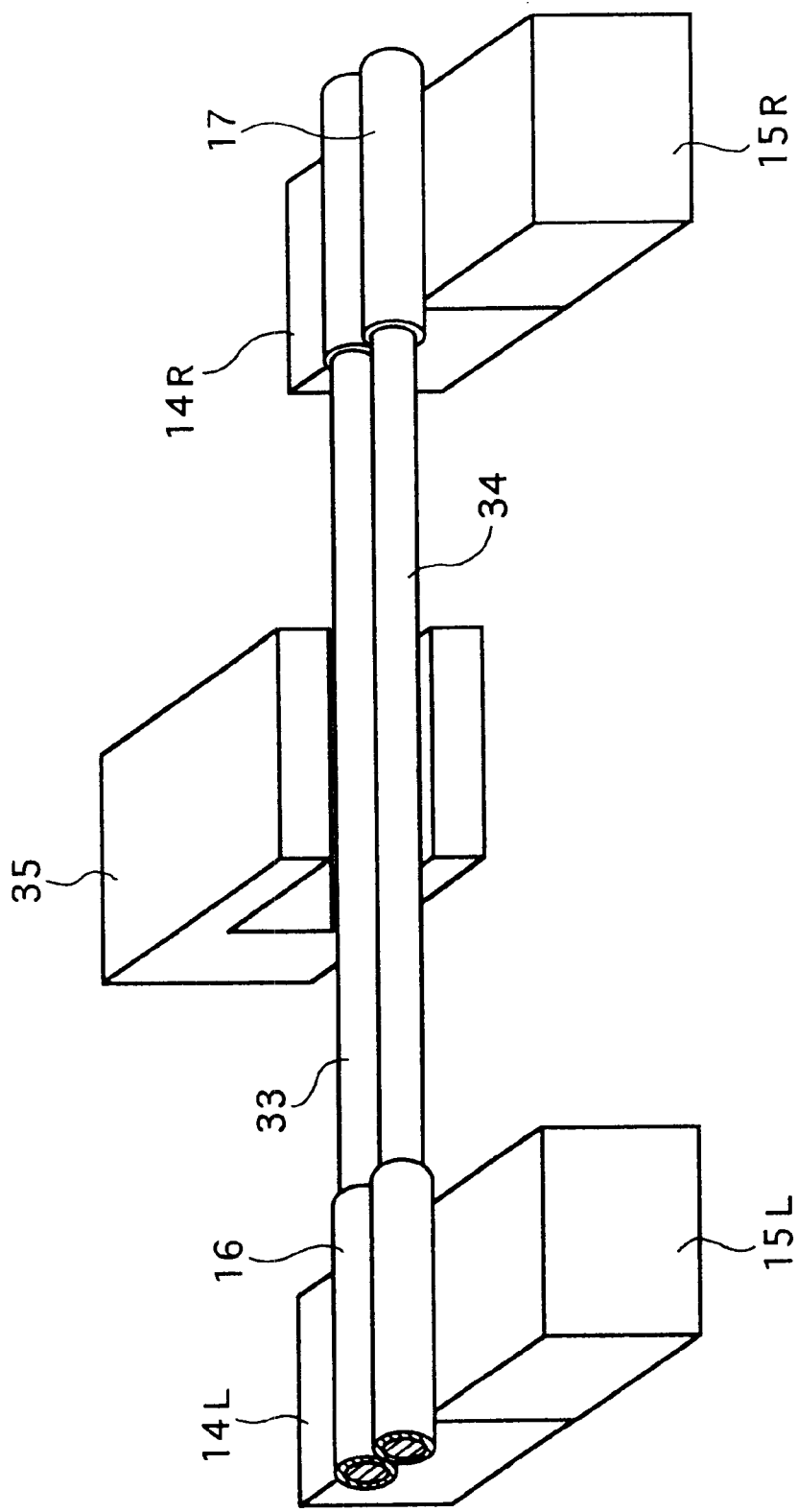
FIG. 8 is a view of a working concept illustrating procedures of fabrication of the optical fiber coupler according to the present embodiment together with FIGS. 7, 9, 11, 12, 14, 15, and 17, in which heating is started to preliminarily draw one optical fiber strand.
Figure 9:
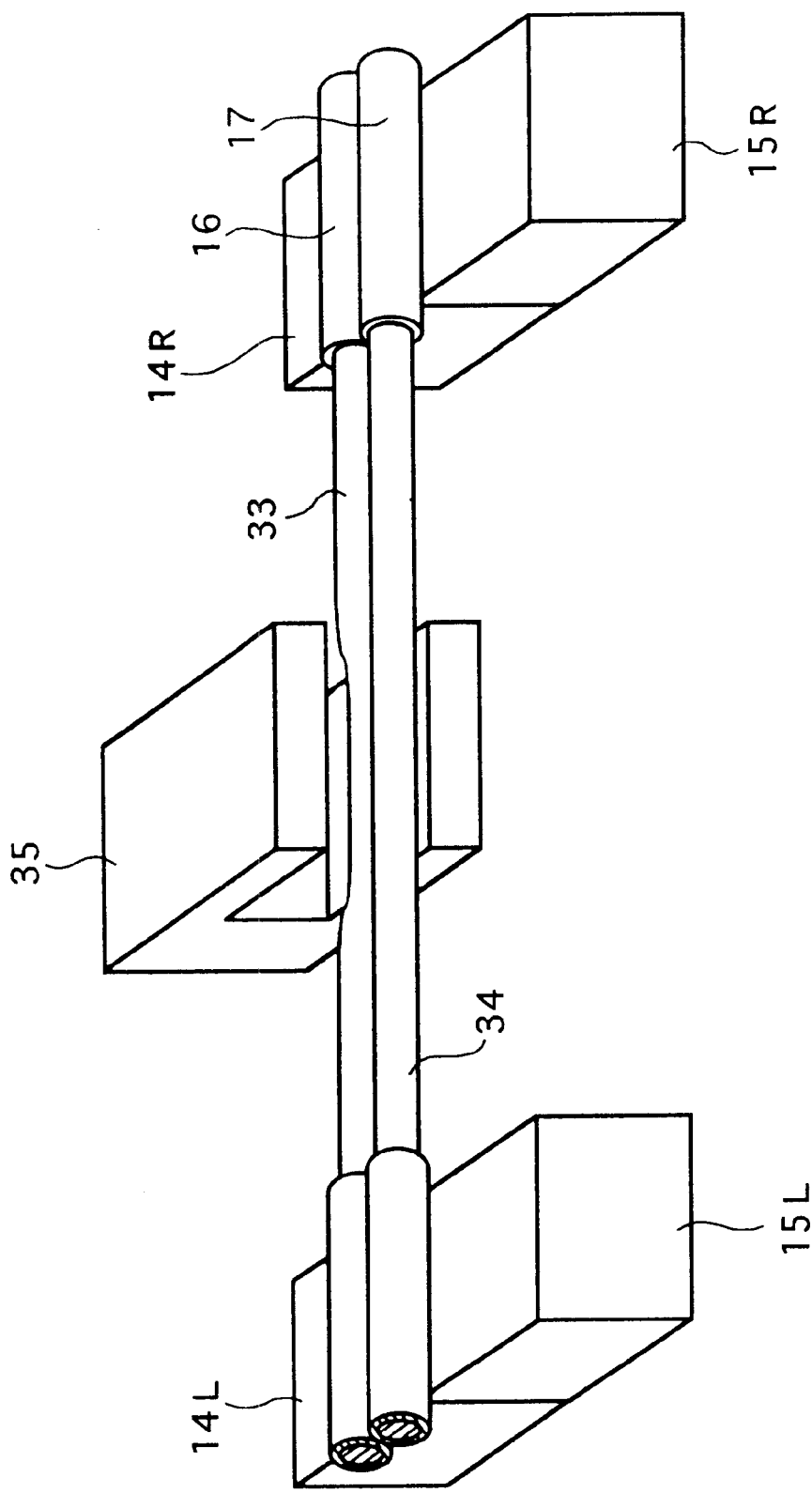
FIG. 9 is a view of a working concept illustrating procedures of fabrication of the optical fiber coupler according to the present embodiment together with FIGS. 7, 8, 11, 12, 14, 15, and 17, in which one optical fiber strand is preliminarily drawn.

Referring here to FIGS. 7 to 18, there are illustrated fabrication procedures for an optical fiber coupler according to the present invention using the optical fiber coupler fabrication apparatus illustrated in FIGS. 1 to 5. As illustrated in FIG. 7, two optical fibers 16 and 17 from which a central coating was previously removed are mounted on the fiber carrying blocks 14 and 15 located at a home position through fiber clamping plates 18L and 18R. The one optical fiber strand 33 is integrally fixed to the strand fixing section 38 using the strand fixing plate 40. Then, as illustrated in FIGS. 8 and 9, the stepping motor 27 is driven while heating the one optical fiber strand 33 with the heater 35 to separate the first fiber carrying block 14 mutually and hereby preliminarily draw the optical fiber 16. Since in the present embodiment, heating for the one optical fiber strand 33 is achieved by the heater 35 using an electric ceramic microheater, the diameter of the optical fiber strand 33 can smoothly be changed by accurately controlling heating temperature.

Figure 10:
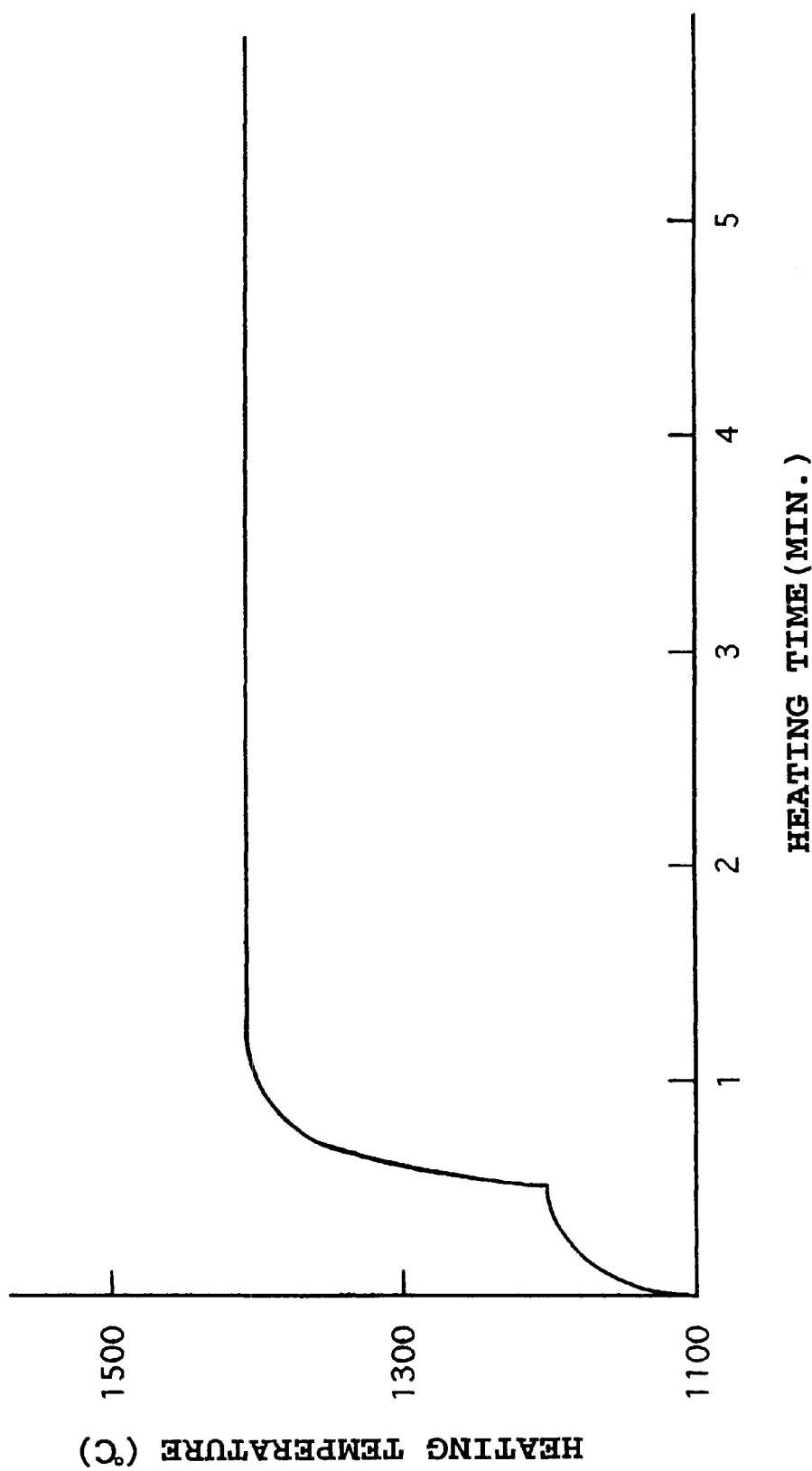
FIG. 10 is a graphical representation illustrating a relationship between time and heating temperature in a preliminary drawing process according to the present embodiment.

Referring to FIG. 10, there is illustrated a relationship between the heating time and a change in heating temperature in such a present embodiment. Firstly, the heater 35 is heated to 1200° C. to eliminate distortion in the optical fiber strand 33, and hen heating for the preliminary drawing. The heating temperature may be arbitrarily set within a range of from 1300 to 1550° C. In the present embodiment, the heating temperature is set to 1400° C., and the optical fiber is preliminarily drawn at a speed of a few to several tens of micrometers per second.

Figure 11:
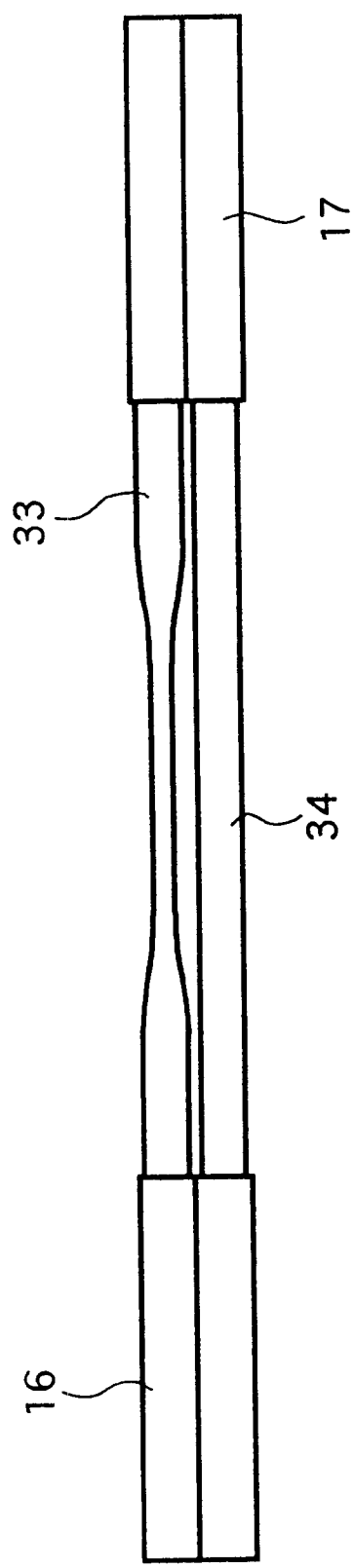
FIG. 11 is a view of a working concept illustrating procedures of fabrication of the optical fiber coupler according to the present embodiment together with FIGS. 7 to 9, 12, 14, 15, and 17, in which preliminary drawing of the one optical fiber strand completes.
Figure 12:
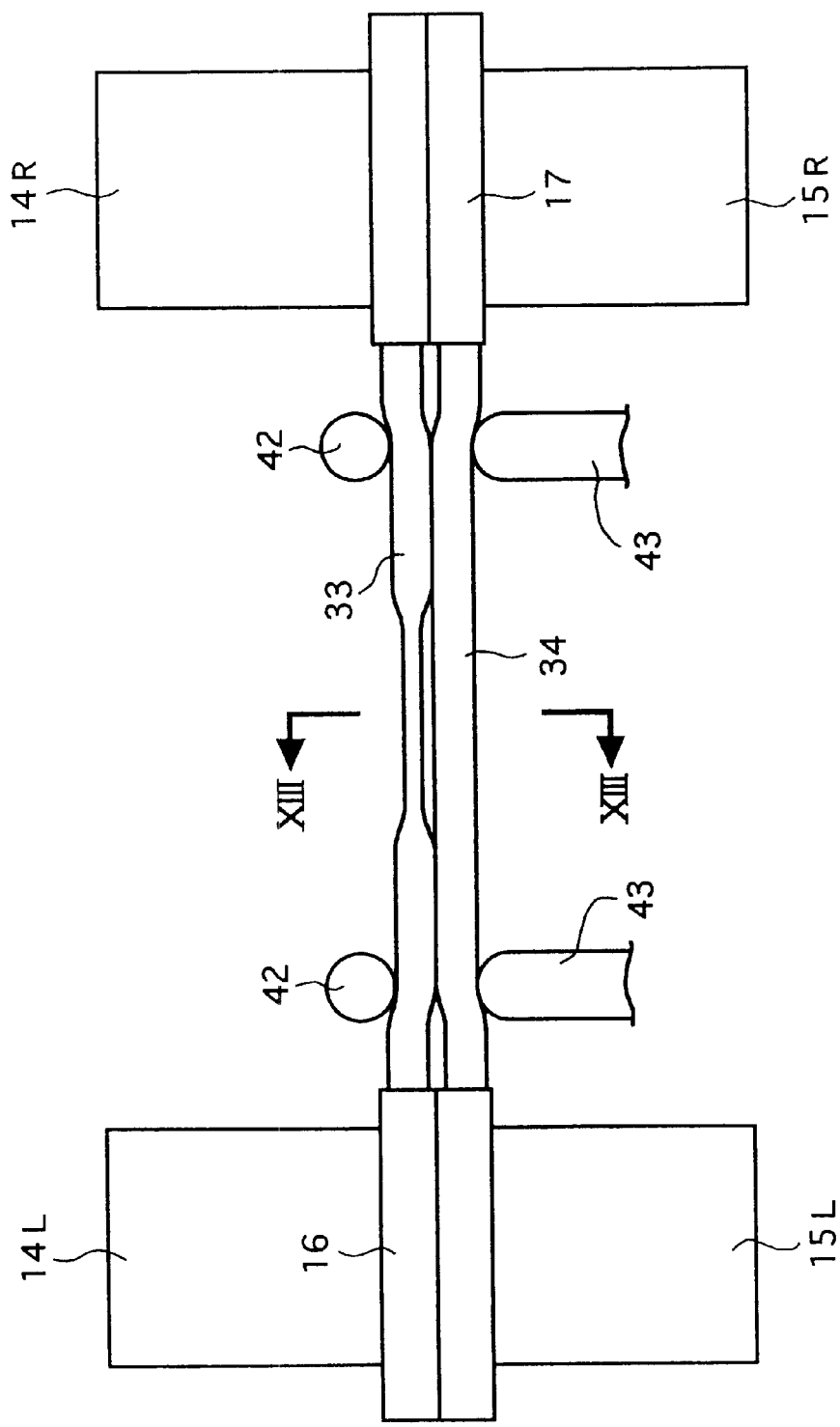
FIG. 12 is a view of a working concept illustrating procedures o fabrication of the optical fiber coupler according to the present embodiment together with FIGS. 7 to 9, 11, 14, 15, and 17, in which heating for the two optical fiber strands is started.
Figure 13:
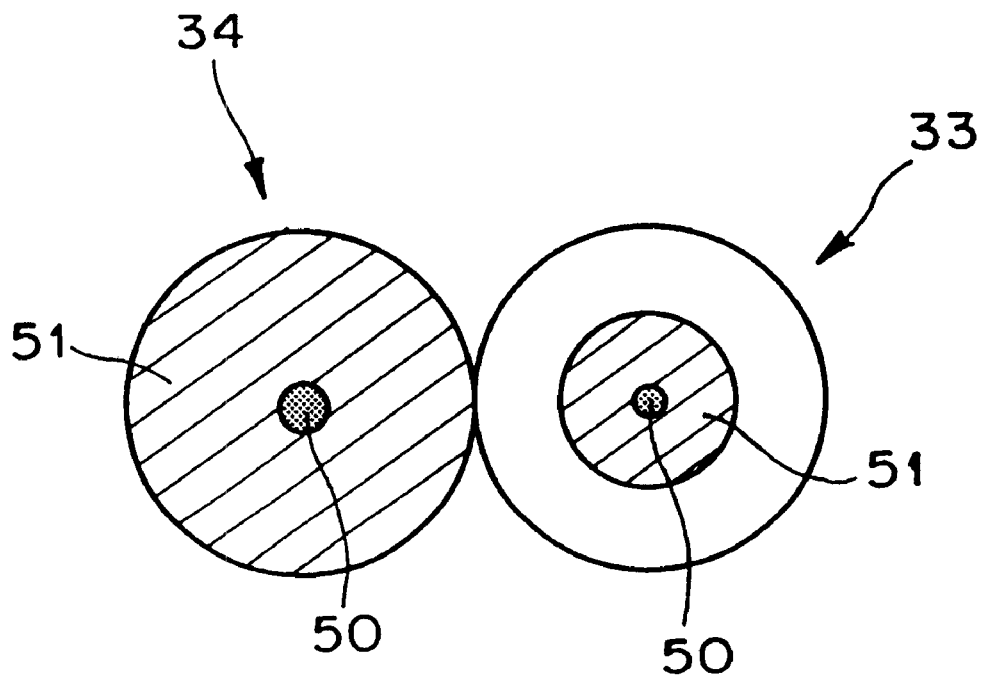
FIG. 13 is a cross sectional view viewed along a line XIII—XIII in FIG. 11.

As illustrated in FIG. 11, there is formed a gap at portions of the optical fiber strands 33 and 34 that corresponds to the thickness of the coating between the optical fiber 16 preliminarily drawing as such and the not drawing optical fiber 17. A gap of about 125 $\mu$m is produced in the present embodiment. The restriction of the one optical fiber strand 33 due to the strand fixing plate 40 is therefore previously released, and the two optical fiber strands 33 and 34 are brought into close contact at not yet drawing portions thereof using the receiving pin 42 and the pressure rod 43, as illustrated in FIGS. 12 and 13. Keeping this state, the two optical fiber strands 33 and 34 are integrally fixed to the strand fixing sections 38 and 39 with the aid of the strand fixing plates 40 and 47, as illustrated in FIG. 5. Further, the first fiber carrying block 14L and the second fiber carrying block 15L both located on the left side and the second fiber carrying block 15L and the second fiber carrying block 15R both on the right side are integrally coupled using the coupling fittings 19. Designated at a symbol 50 in FIG. 13 is core portions of the optical fiber strands 33 and 34 associated with the propagation of the optical signal, and 51 is a clad portion surrounding the core section.

Figure 14:
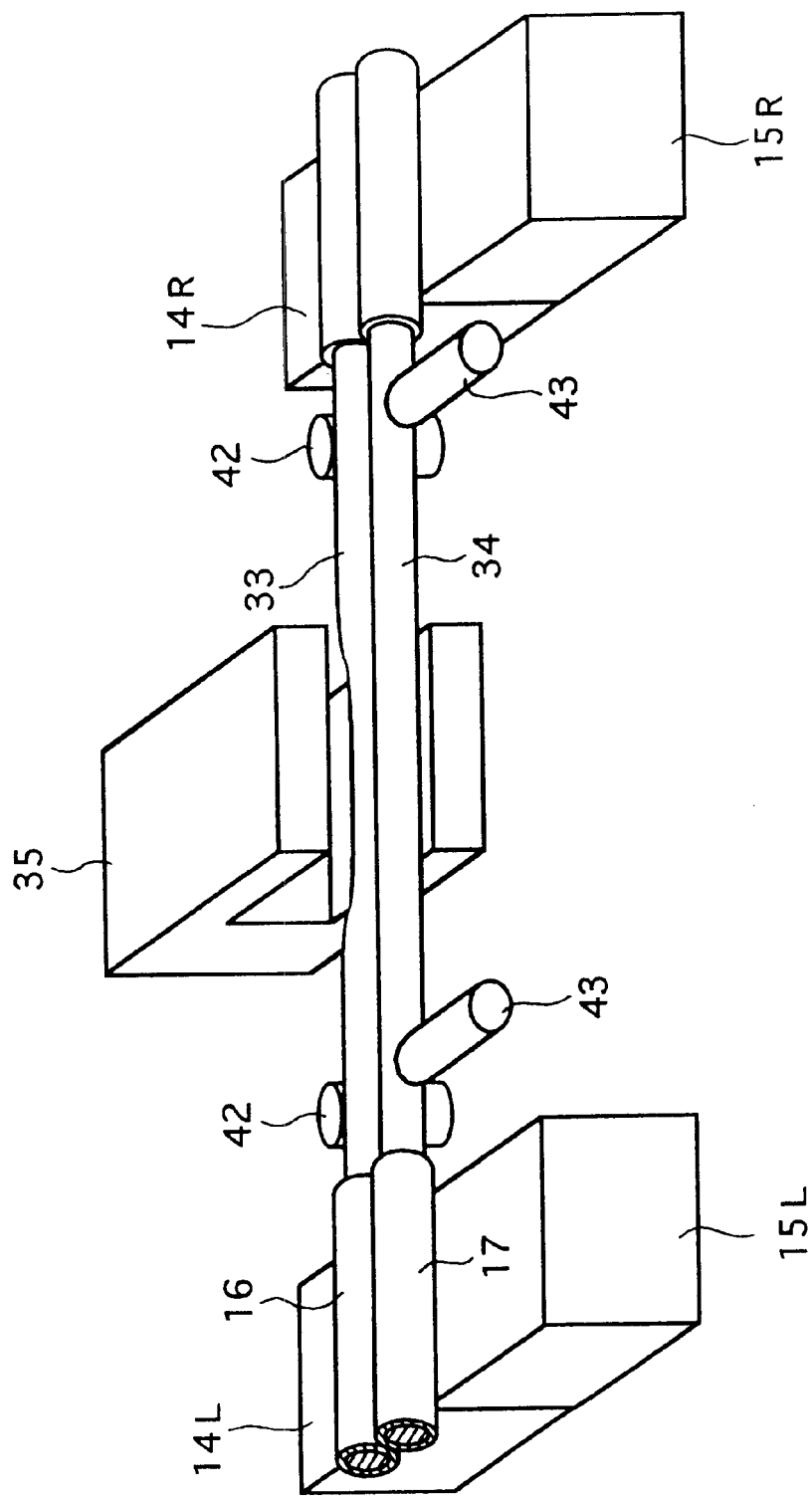
FIG. 14 is a view of a working concept illustrating procedures of fabrication of the optical fiber coupler according to the present embodiment together with FIGS. 7 to 9, 11, 12, 15, and 17, in which forcing means is operated to bring the two optical fiber strands to contact with each other.
Figure 15:
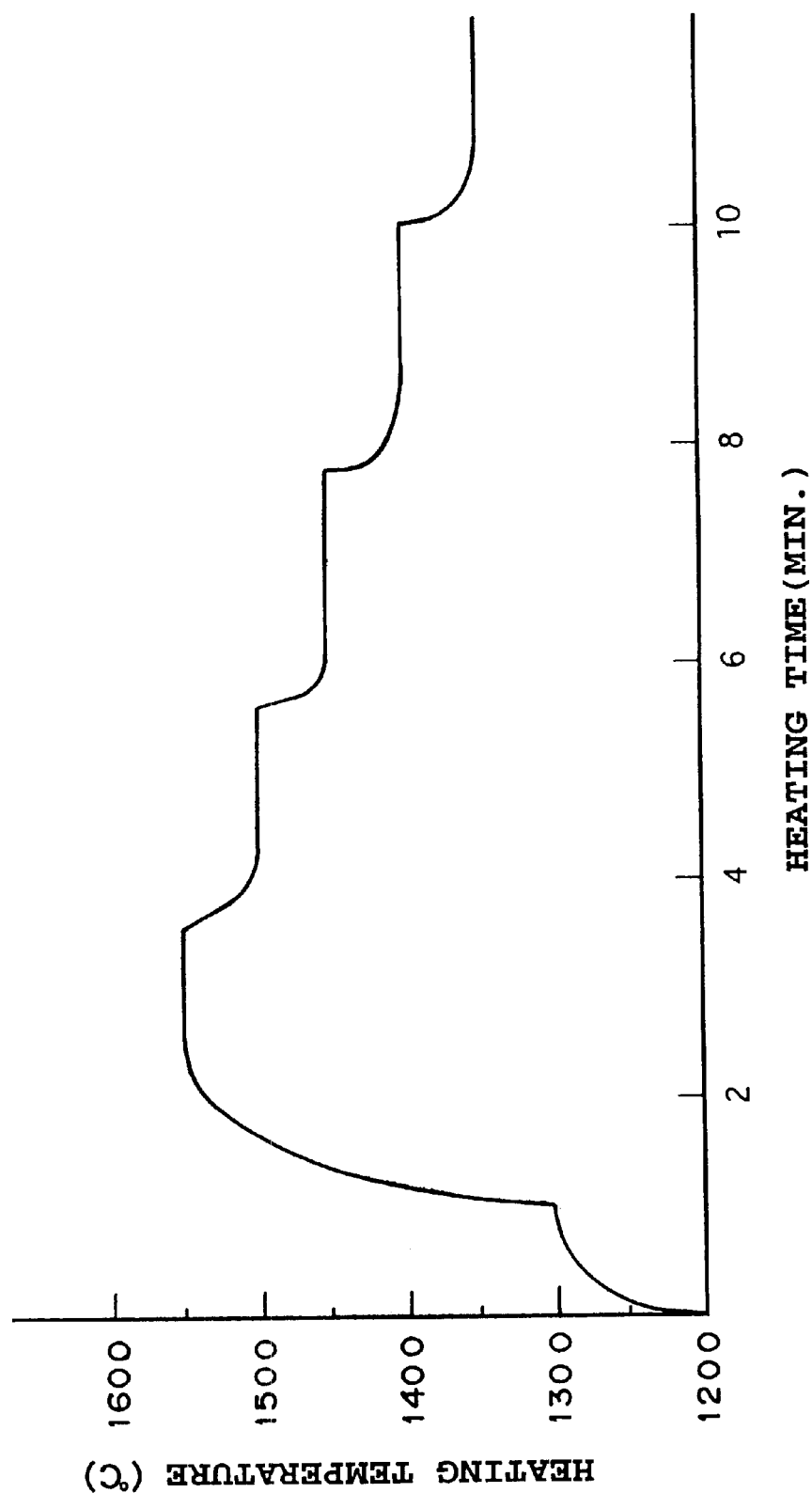
FIG. 15 is a graphical representation illustrating a relationship between time and heating temperature in a melting drawing process in the present embodiment.
Figure 16:
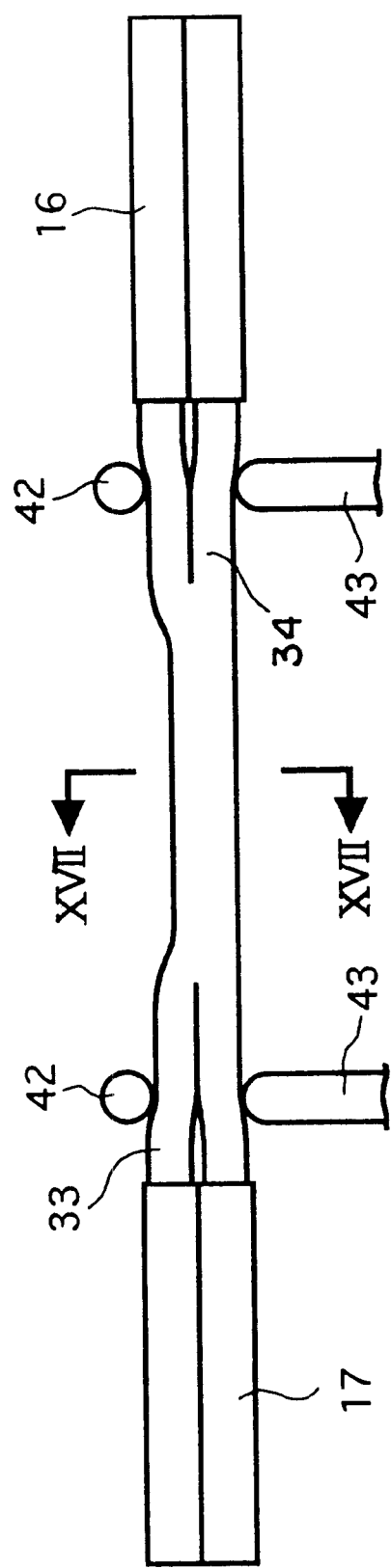
FIG. 16 is a view of a working concept illustrating procedures of fabrication of the optical fiber coupler according to the present embodiment together with FIGS. 7 to 9, 11, 12, 14, and 17, in which the two optical fiber strands is in the state of heating.
Figure 17:
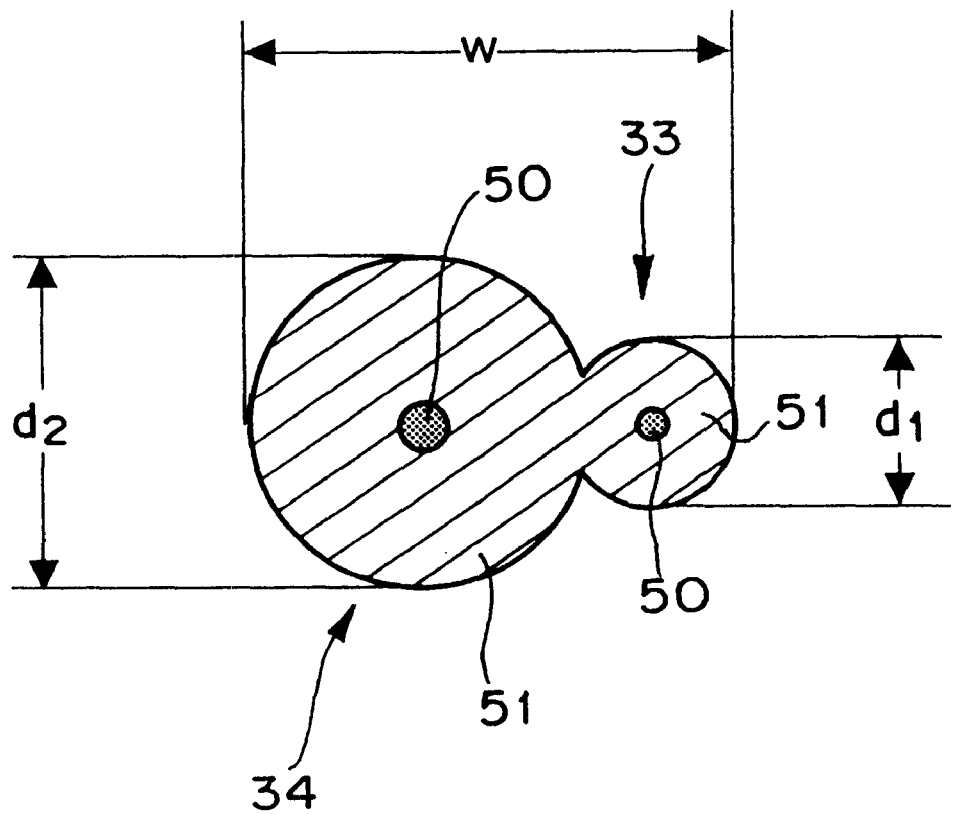
FIG. 17 is a cross sectional view viewed along a line XVII—XVII in FIG. 15.

Thereafter, the position of the heater 35 is set for melting and drawing process such that the centers of the two optical fiber strands 33 and 34 are located at the neighborhood of the center of the channel of the heater 35, as illustrated in FIG. 14. FIG. 15 illustrates a relationship between the heating time and the heating temperature in the melting and drawing process in the present embodiment. More specifically, the heater 35 is firstly heated to 1200° C. to eliminate the distortion of the optical fiber strands 33 and 34. Thereafter, maximum heating temperature is set to 1550° C. for heating for melting, as illustrated in FIGS. 16 and 17. Further, the stepping motors 27 and 28 are driven in synchronism to separate the left side fiber carrying blocks 14L, 15L and the right side fiber carrying blocks 14R, 15R from each other for drawing for the optical fibers 16 and 17 for a predetermined time, as illustrated in FIG. 1. The heating temperature in the drawing process in the present embodiment is lowered stepwise from 1550° C. that is the heating temperature in the melting process. The two optical fibers 16 and 17 are drawn at the speed of a few to several tens of micrometers per second. Only the melting is performed at the heating temperature of 1550° C., and upon the drawing process the heating temperature is lowered to about 1520° C., and the optical fibers 16 and 17 may be drawn while lowering the temperature stepwise.

Figure 18:
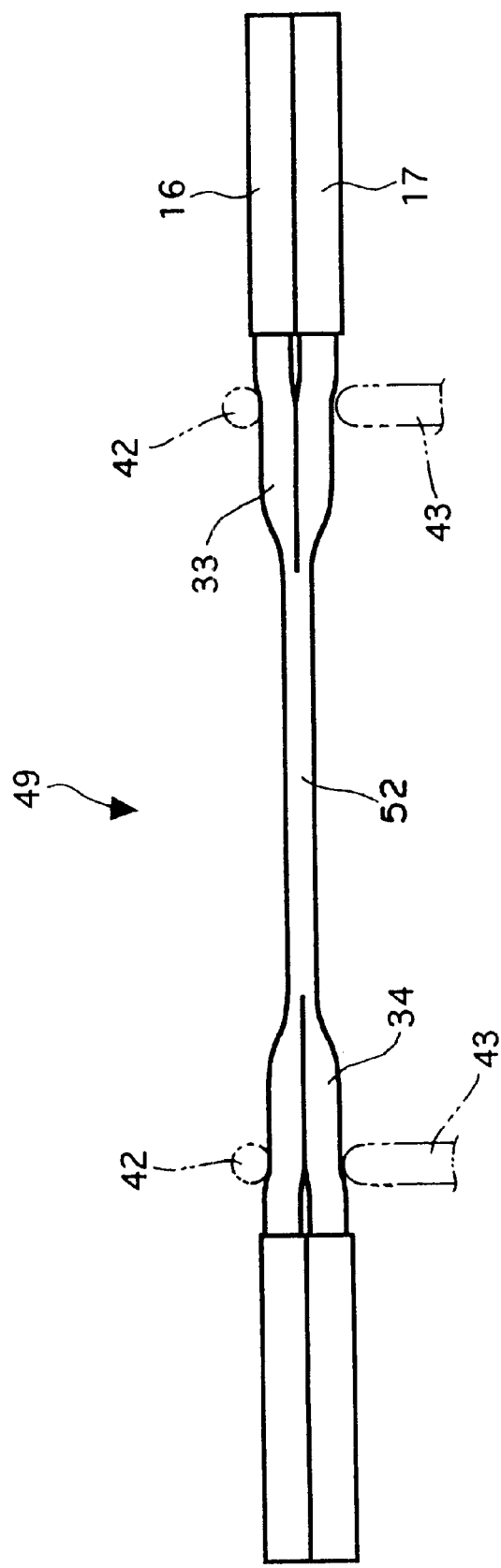
FIG. 18 is a view of a working concept illustrating procedures of fabrication of an optical fiber coupler according to the present embodiment together with FIGS. 7 to 9, 11, 12, 14, and 15, in which heating and drawing for the two optical fiber strands are completed.

There is ensured an optical fiber coupler 49 possessing a drawing melting section 52 drawn as illustrated in FIG. 18. The reason where the heating temperature is changed in multiple steps for drawing is that any defect is prevented from happening with an improvement of the yield and that an optical fiber coupler t49 possessing a desired branch ratio is securely obtained. In the present embodiment, there is ensured an optical fiber coupler 49 in which a melting rate C of the drawing melting section 52 is 4% and which is in a substantially line contact state.

Figure 19:
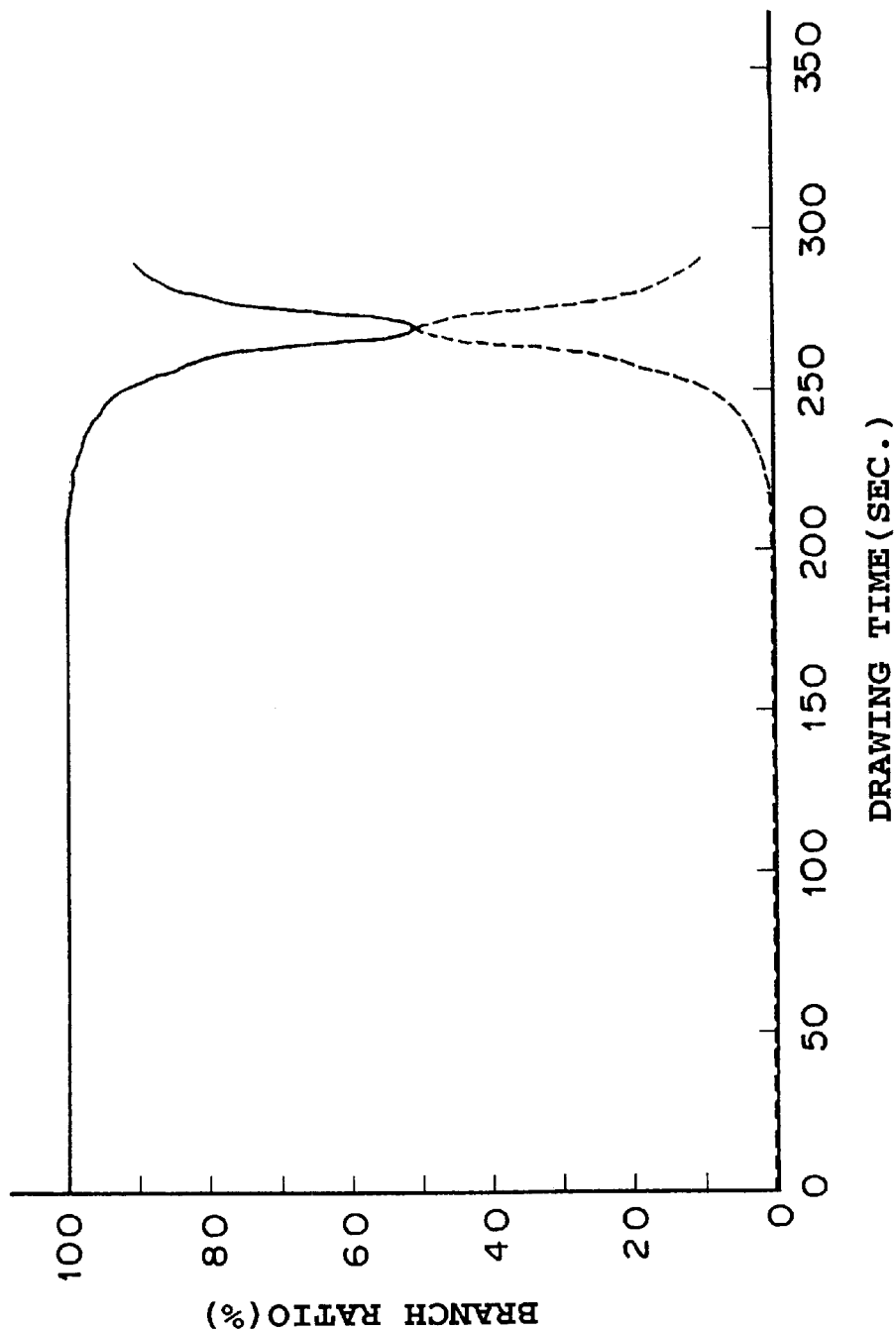
FIG. 19 is a graphical representation illustrating a relationship between drawing time and the branch ratio in the embodiment of the optical fiber coupler fabricated by the present invention.
Figure 20:
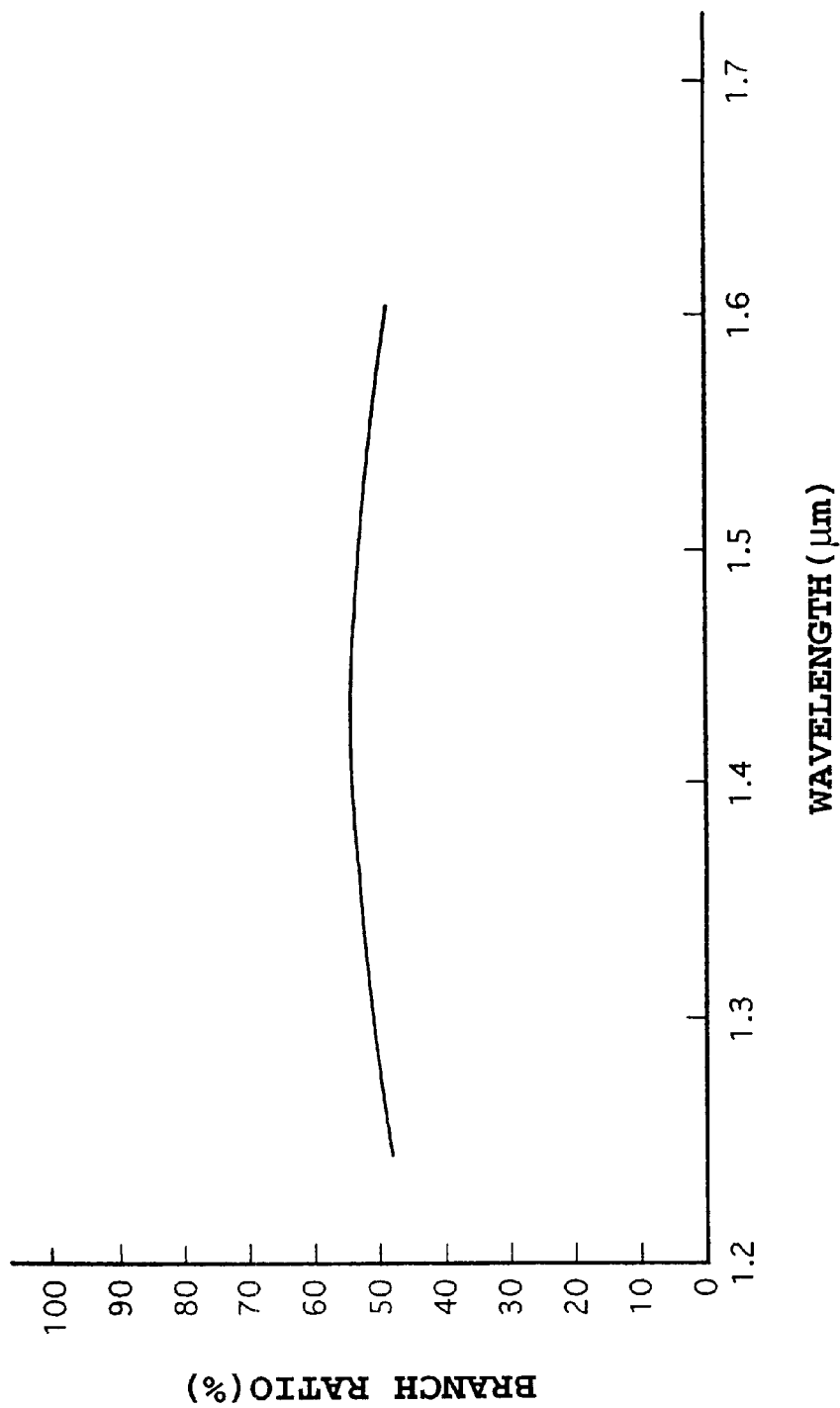
FIG. 20 is a graphical representation illustrating wavelength dependency in the present embodiment of the optical fiber coupler fabricated by the present invention.

There is prepared optical fibers 16 and 17 where the diameter of the core section 50 is 8 μm, the outer diameter of the clad section 51 is 125 μm, and a difference between refractive indexes of the core section and the clad section is about 0.3%. An optical fiber coupler 49 according to the one embodiment of the present invention is thus obtained following the aforementioned procedures by preliminarily drawing the one optical fiber strand 33 by about 0.3 mm, and heating and melting these two optical fibers 16 and 17 and further drawing them. Referring to FIG. 19, there is illustrated a relationship between the heating drawing time in the final process and the branch ratio of the resulting optical fiber coupler 49. Referring further to FIG. 20, there is illustrated wavelength dependency with respect to the branch ratio of the resulting optical fiber coupler 49. These characteristics correspond to the optical fiber coupler 49 according to the present embodiment which coupler is melted in a substantially line contact state with the melting rate C of the melting section 52 being 4%. It is confirmed as clearly demonstrated in FIGS. 19 and 20 that deflection with respect to the branch ratio of 50% is substantially ±5% over the wavelength range of from about 1.2 μm to 1.6 μm, ensuring an optical fiber coupler 49 with less wavelength dependency. It is confirmed that the resulting coupler is a high performance optical fiber coupler 49 with less PDL and less excess loss, e.g. its PDL of 0.03 dB excess loss of 0.07 dB.

In the aforementioned embodiment, workability can be improved by previously arranging the two optical fibers 16 and 17 in parallel to each other and preliminarily drawing the one optical fiber 16 while keeping the aligned state. For securely avoiding a thermal influence to the other optical fiber upon preliminarily drawing the fiber, however, it may be allowed to previously removing the other optical fiber 17 from the fiber carrying blocks 14 and 15, and preliminarily drawing only the one optical fiber 16, and thereafter mounting the other optical fiber 17 not preliminarily drawing on the fiber carrying blocks 14 and 15, and aligning them in parallel to each other to simultaneously heating and drawing the two optical fibers 16 and 17. It is herein noticed that there can be eliminated the use of the ones of the two sets of the fiber carrying blocks 14 and 15 and the driving mechanisms for the formers, and hence the installation cost can be sharply reduced.

Even with use such a method there can be fabricated a wide-bandwidth optical fiber coupler where wavelength dependency is only ±5% with respect to the branch ratio of 50%. The excess loss of the optical fiber coupler is 0.05 dB with PDL 0.02 dB, which can be confirmed to be very high quality optical fiber coupler.

Figure 21:
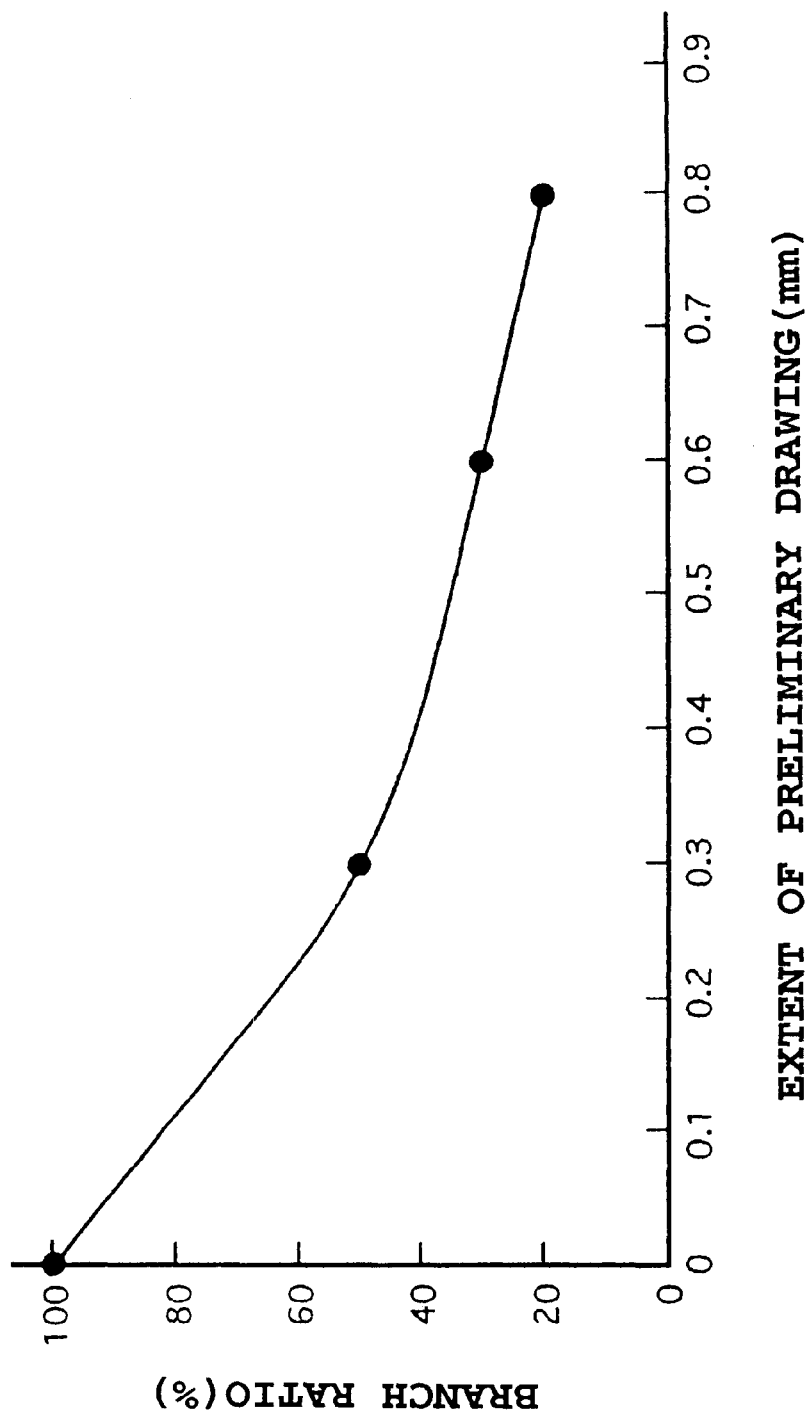
FIG. 21 is a graphical representation illustrating a relationship between the amount of preliminary drawing of the one optical fiber strand and a branch ratio of the optical fiber coupler.

Referring to FIG. 21, there is provided a relationship in an initial heating process between the amount of preliminary drawing of the preliminarily drawing optical fiber 16 and a branch ratio of the optical fiber coupler obtained by the present invention. As clarified from FIG. 21, it is understood that it is possible to fabricate an optical fiber coupler possessing an arbitrary branch ratio by varying the amount of preliminary drawing of the one optical fiber 16.

In the aforementioned embodiment, although there was described the optical fiber coupler 49 using the two optical fibers 16 and 17 including the clad section 51 possessing different outer diameters upon melting, the present invention may be applicable to an optical fiber coupler using two optical fibers including the clad section possessing the same outer diameter upon melting.

Figure 22:
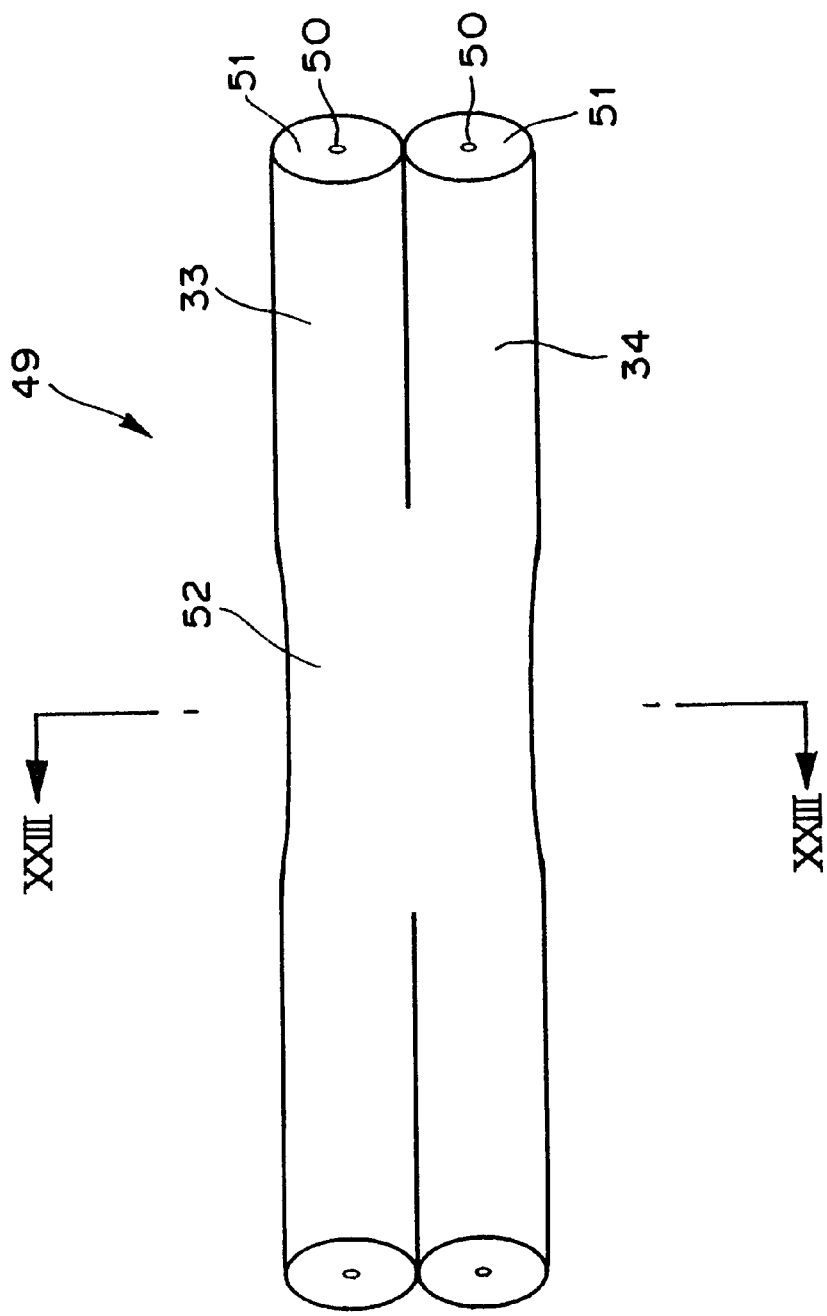
FIG. 22 is a perspective view illustrating an external appearance of a melting portion in another embodiment of the optical fiber coupler according to the present invention.
Figure 23:
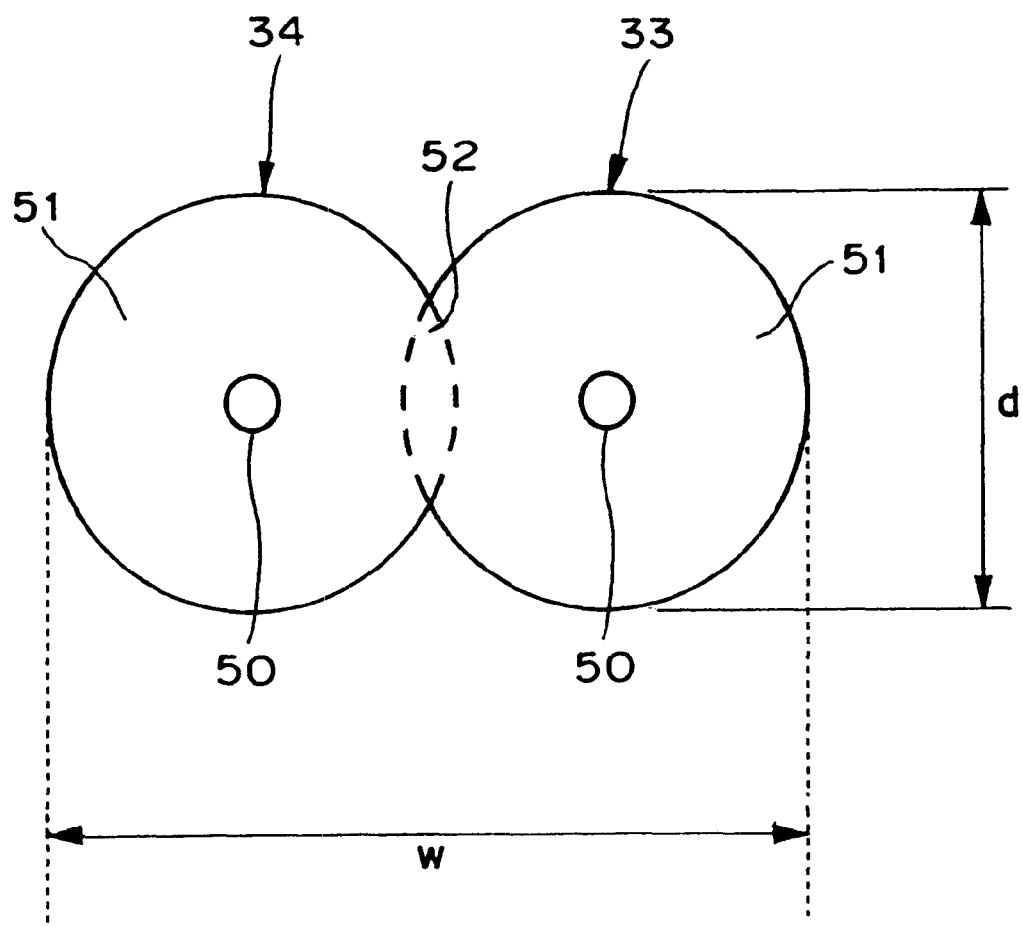
FIG. 23 is a cross sectional view illustrating a line XXIII—XXIII in FIG. 22.

Referring to FIG. 22, there is illustrated the structure of another embodiment of such an optical fiber coupler according to the present invention, and further referring to FIG. 23, there is illustrated a view of a cross sectional structure, viewed along a line XXIII—XXIII, in which the same symbol will be simply applied to the same function element as the aforementioned embodiment, and overlapped description will be omitted. More specifically, as illustrated in FIG. 22, structural parameters of the optical fiber strands 33 and 34, there are the same as those of the previous embodiments the diameter of the core section 50, the diameter of the clad section 51, a specific refractive index, and a cutoff wavelength, for example. The diameter d of the clad section 51 of the optical fiber strands 33 and 34 is 125 μm. A refractive index difference between the clad section 51 and the core section 50 possessing the diameter of 6.5 μm is 0.3%. The degree C of melting of the drawing melting section 52 is expressed by $$C = \{1 - (W/2d)\} \times 100$$

with the assumption of the maximum width size of the melting section 52 to be W, which is 5% or less in the present embodiment and is a state substantially equal to linear melting. The degree C of the melting is 10% or less to the utmost, especially 7% or less.

Figure 24:
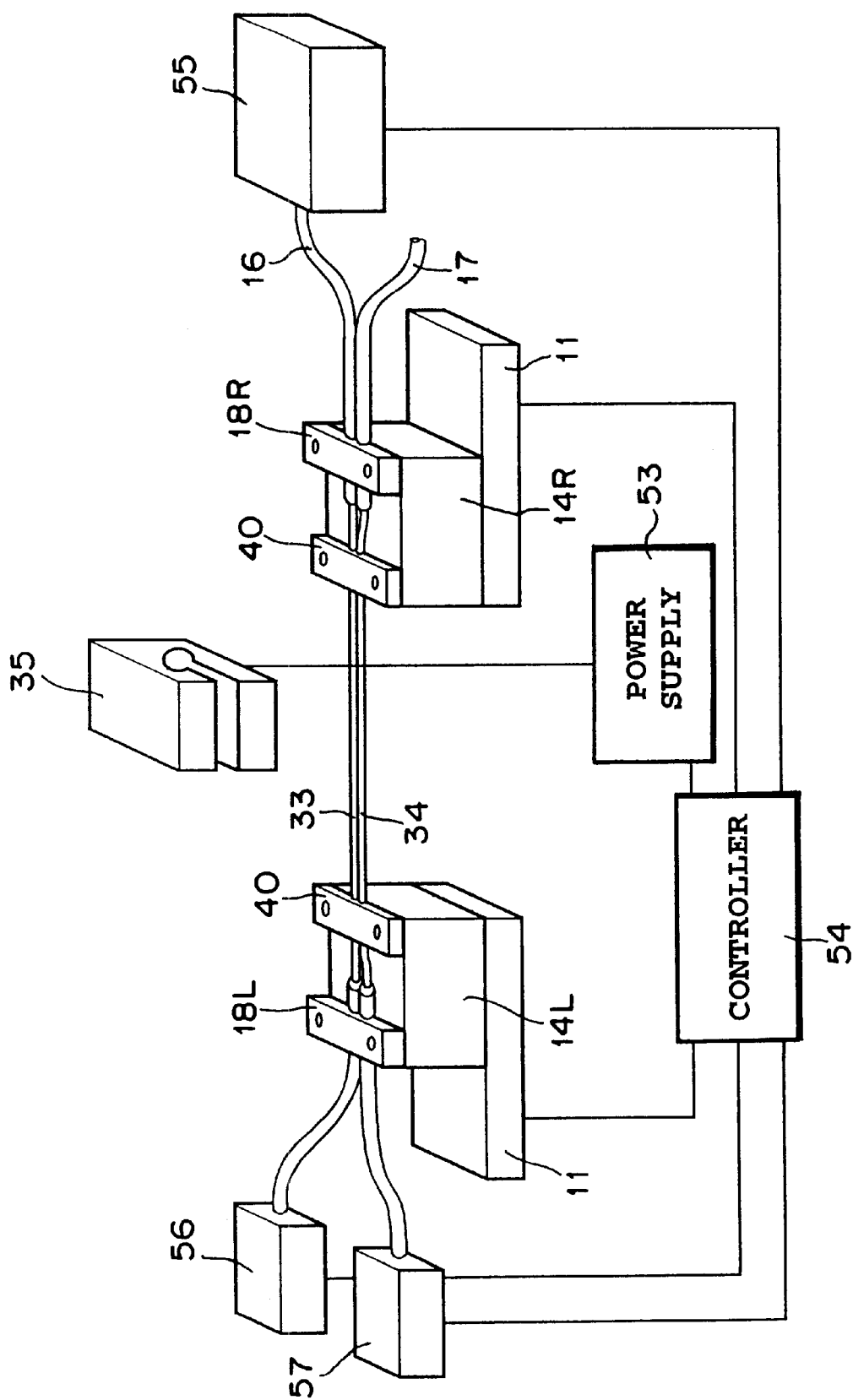
FIG. 24 is a view of a concept illustrating a schematic construction of another embodiment of an apparatus for fabricating an optical fiber coupler according to the present invention.

Since upon fabrication of such an optical fiber coupler 49, there is eliminated the need of the preliminary drawing process as in the aforementioned embodiments, it is also possible to employ the optical fiber coupler fabrication apparatus illustrated in FIGS. 1 to 5. It is however possible to employ the more simple structure optical fiber coupler fabrication apparatus as illustrated in FIG. 24 having the construction demonstrated by a substantially upper half of that illustrated in FIG. 1. More specifically, the two optical fibers 16 and 17 possessing the same structural parameter with the coatings of their central portions previously removed are mounted on the fiber carrying block 14 located at the home position through the fiber clamping plates 18L and 18R, and non-drawn regions of the two optical fiber strands 33 and 34 are brought into contact with each other using the receiving pin 42 (not shown) and the pressure rod 43, as illustrated in FIG. 5. Keeping this state, the strand fixing plate 40 is employed to integrally fix the two optical fiber strands 33 and 34 to the strand fixing plate 38, as illustrated in FIG. 5.

Thereafter, the position of the heater 35 is set for the melting and drawing process such that the centers of the two optical fiber strands 33 and 34 are located in the vicinity of the center of the channel in the heater 35. The portions of the optical fiber strands 33 and 34 that form the melting section 52 of the same are heated and melted by supplying a current from the power supply 53 to the heater 35. The controller 54 controls supplied electric power from the power supply 53 and the movement Of the fiber carrying block 14. Upon the work being first done the heater 35 is withdrawn to its standby position before the process enters the drawing process. The melting state of the melting section 52 is observed with a microscope to determine the optimum melting temperature and the melting time. This is preferably stored in the controller 54. Provided that the optimum melting temperature and the melting time have previously been determined as described above, the melting process and the drawing process can be continuously performed from the next time. In the drawing process the drawing process is achieved while measuring the branch ratio at a predetermined wavelength 1.55 µm from the monitor light source 55. Laser diode of 1.55 µm is herein connected with the one end of the one optical fiber 16 as the monitor light source 55. The optical detection sensor 56 is connected with the other end of the one optical fiber 16, and the optical detection sensor 57 is also connected with the other end of the other optical fiber 17. Lights from the monitor light source 55 of 1.55 µm wavelength are employed to measure the branch ratio thereof. The branch ratio is fed-back to the controller 54, and when the branch ratio becomes 10% for example, the drawing process is finished.

Figure 25:
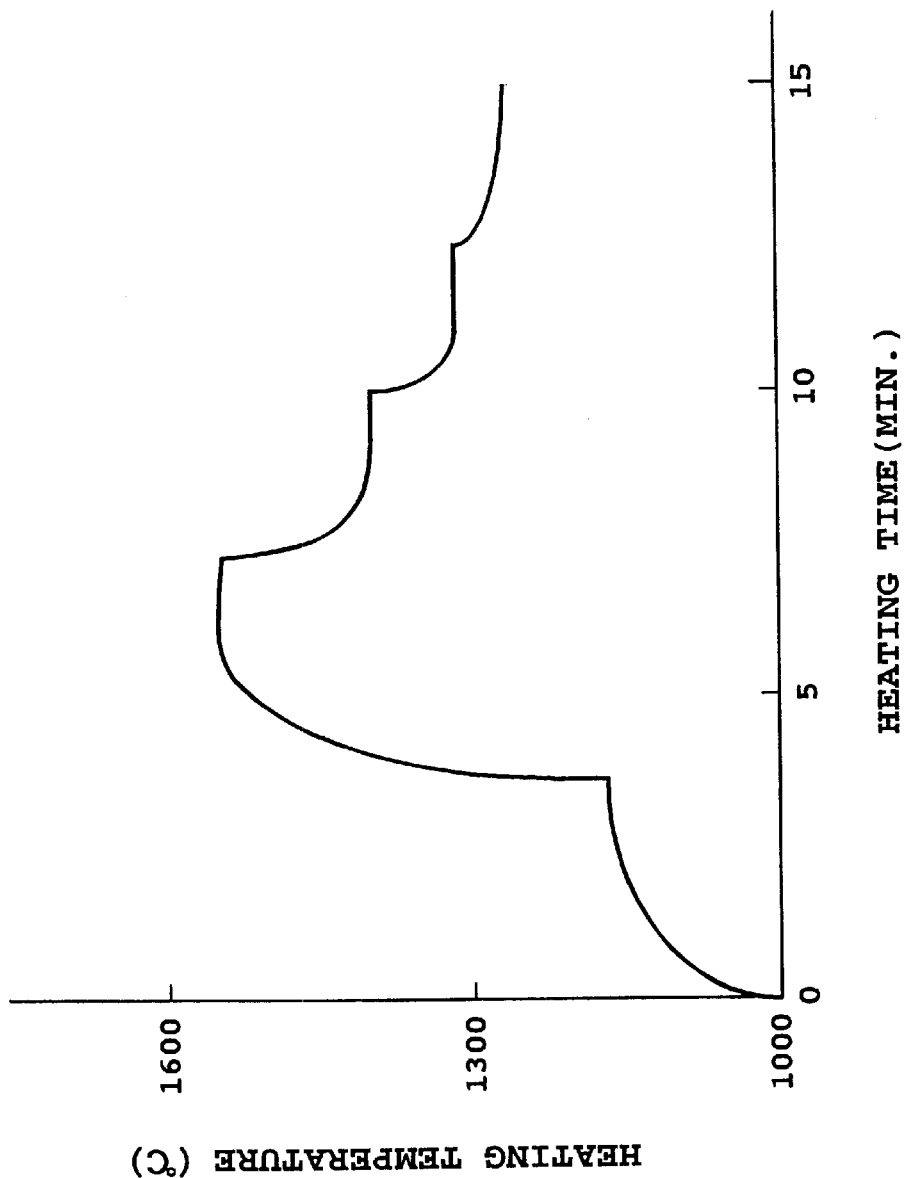
FIG. 25 is a graphical representation illustrating a relationship between time and heating temperature in a melting and drawing process for an optical fiber coupler using the apparatus illustrated in FIG. 24.

Referring to FIG. 25, there is illustrated a relationship between the heating time and the heating temperature in the melting and drawing process in the present embodiment. The heater 35 is first heated to 1150° C. to remove distortion of the optical fiber strands 33 and 34, and the highest heating temperature is set to 1650° C. for example for heating for melting. The stepping motor 27 is driven as illustrated in FIG. 1 to mutually separate the left side fiber carrying block 14L and the right side fiber carrying block 14R and hence draw the optical fiber strands 33 and 34 in the melted state for a predetermined time. The heating temperature in the drawing process in the present embodiment ranges from 1650° C. that is the heating temperature in the melting process to 1400° C. and is lowered stepwise from 1400° C. The two optical fiber strands 33 and 34 are drawn, while lowering the temperature at the speed of a few to several tens micrometers per second. There is thus obtained the optical fiber coupler 49 including such a melting portion 52 as illustrated in FIG. 22 in which the melting rate C is 10% and it is in substantially in the linear contact state.

Figure 26:
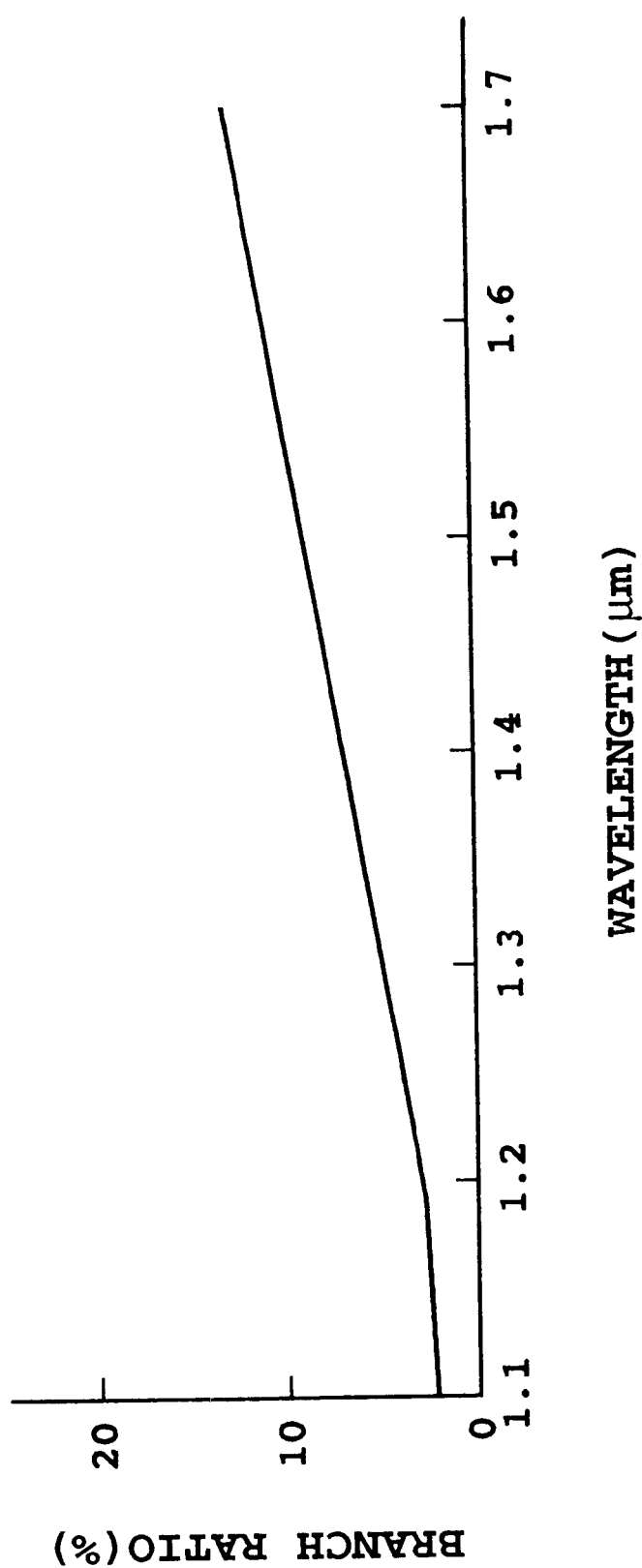
FIG. 26 is a graphical representation illustrating wavelength dependency in another embodiment of the optical fiber coupler according to the present invention.

Referring to FIG. 26, there is illustrated the wavelength characteristic of an optical fiber coupler thus fabricated. As illustrated in the same Figure, the branch ratio substantially monotonically increases within the wavelength range of from 1.1 µm to 1.7 µm within the range of from 2 to 12%. The branch ratio ranges within 2 to 12% in the using wavelength range 1.3 µm to 1.55 µm (i.e. the amount of a change of the branch ratio ranges within 5%), that is satisfactorily flat. It will be understood that this is practical as the optical fiber coupler 49. Even taking into consideration of variations of fabrication rots, most of the variations of the branch ratio falls within 20%.

Figure 27:
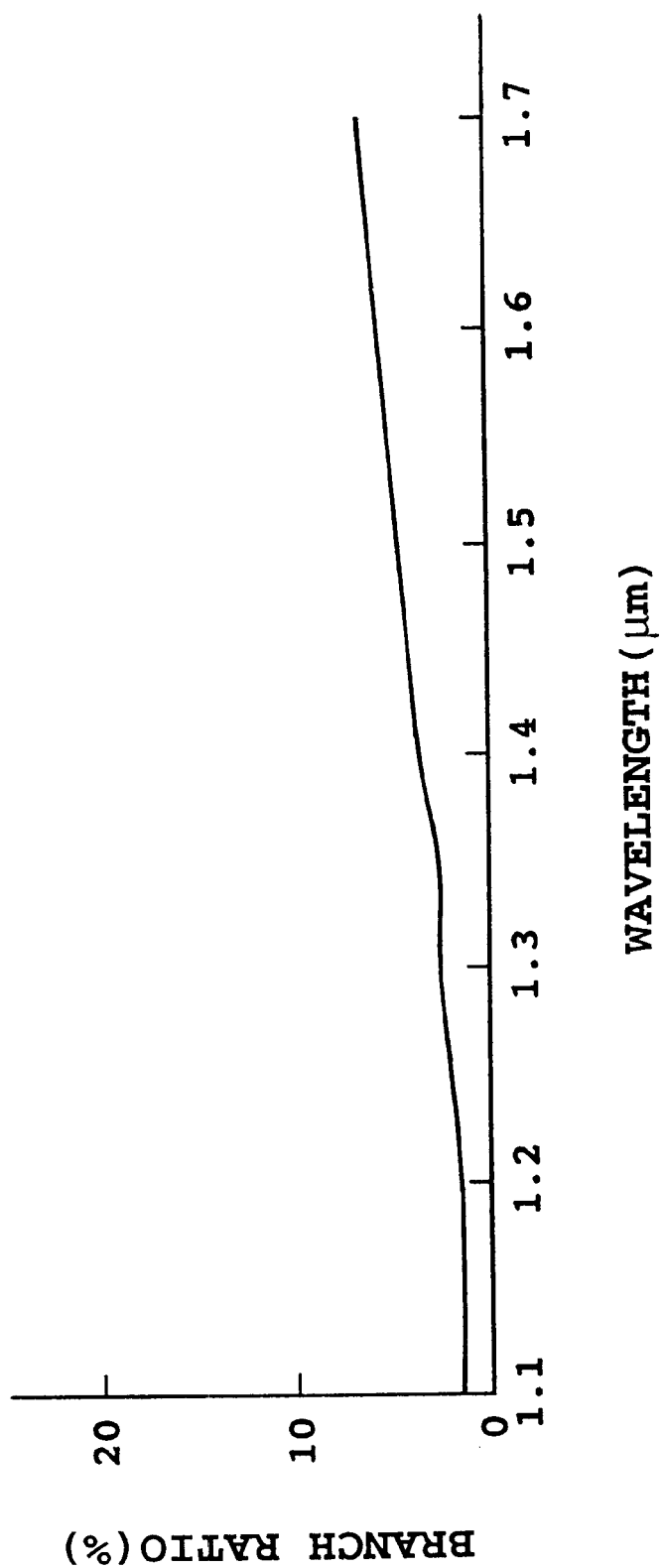
FIG. 27 is a graphical view illustrating wavelength dependency in another embodiment of the optical fiber coupler of the present invention.

Although in the foregoing embodiment the drawing is interrupted at the time when the branch ratio becomes 10%, when the optical fiber coupler 49 possessing the branch ratio of 5% is fabricated, it can be fabricated in the same manner as in the foregoing embodiment excepting that the drawing is finished when the branch ratio in measurement becomes 5%. Referring to FIG. 27, there is illustrated the wavelength characteristic of the optical fiber coupler possessing the branch ratio becoming 5%. The branch ratio increases substantially monotonically within the wavelength range of from 1.1 to 1.7 µm, and the branch ratio falls within 2 to 7%. The branch ratio ranges within 2.5 to 5% in the using wavelength range 1.3 µm to 1.55 µm (i.e. variations thereof falls within 3.5%). It will be understood that the branch ratio is satisfactorily flat and a resulting optical fiber coupler is practical as the optical fiber coupler.

It is therefore possible to fabricate a wide-bandwidth optical fiber coupler possessing a desired branch ratio only by changing the setting of the branch ratio when the drawing is finished without the use of two optical fibers having different structural parameters.

Figure 28:
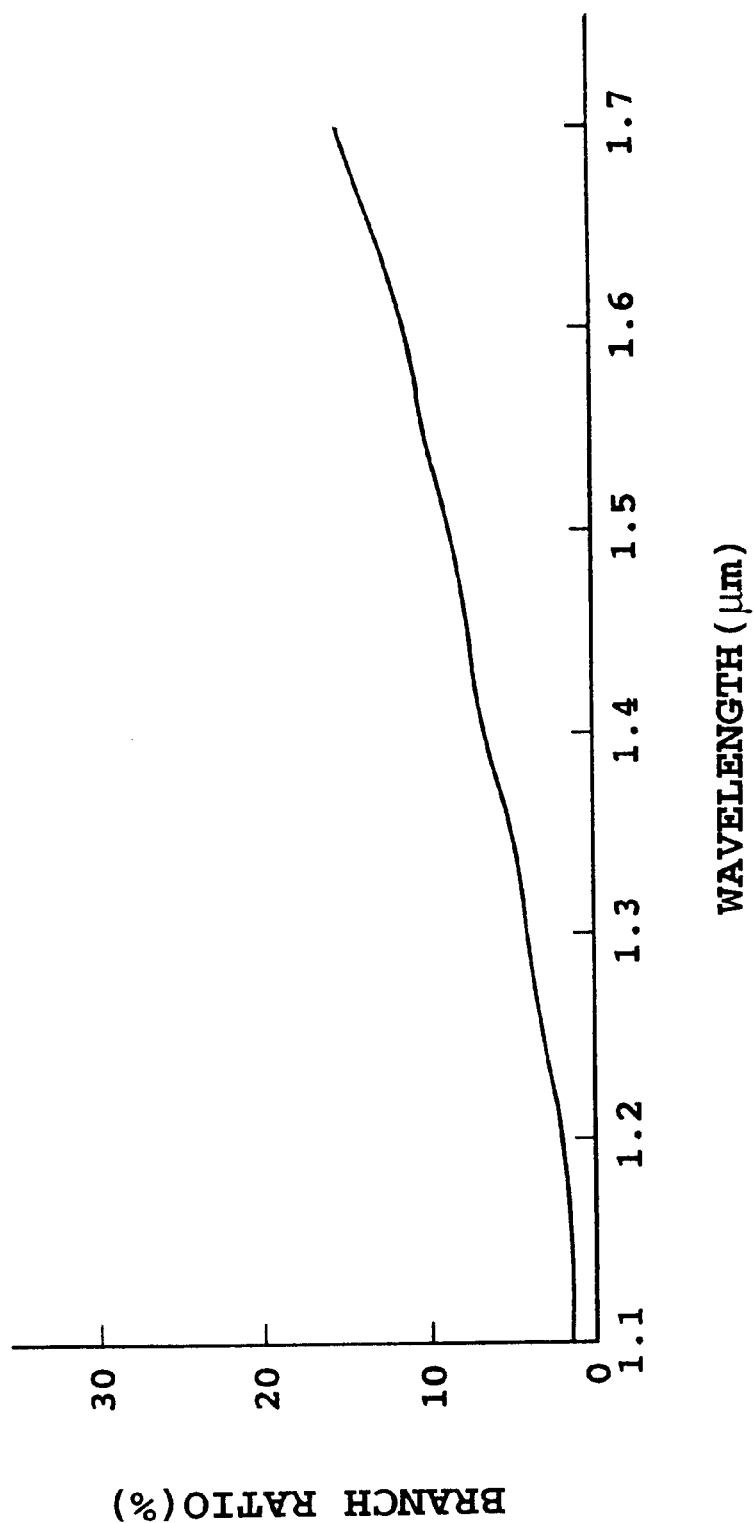
FIG. 28 is a graphical view illustrating wavelength dependency in further another embodiment of the optical fiber coupler of the present invention.
Figure 29:
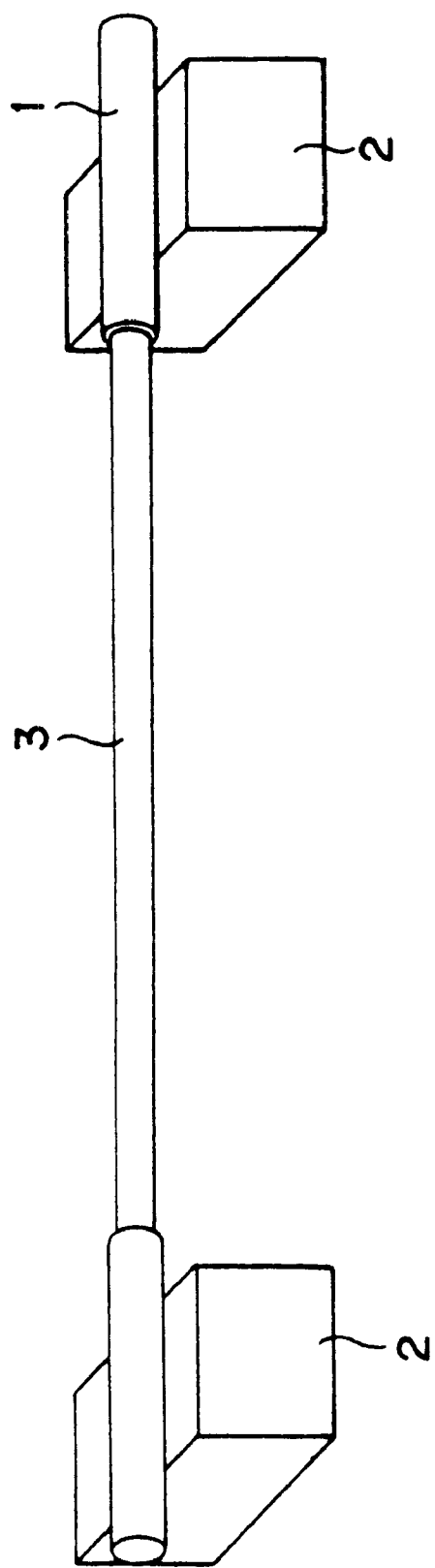
FIG. 29 is a view of a working concept illustrating an example of a method for fabricating a prior art optical fiber coupler together with FIGS. 30 and 31, in which an optical fiber before preliminary drawing is fixed.
Figure 30:
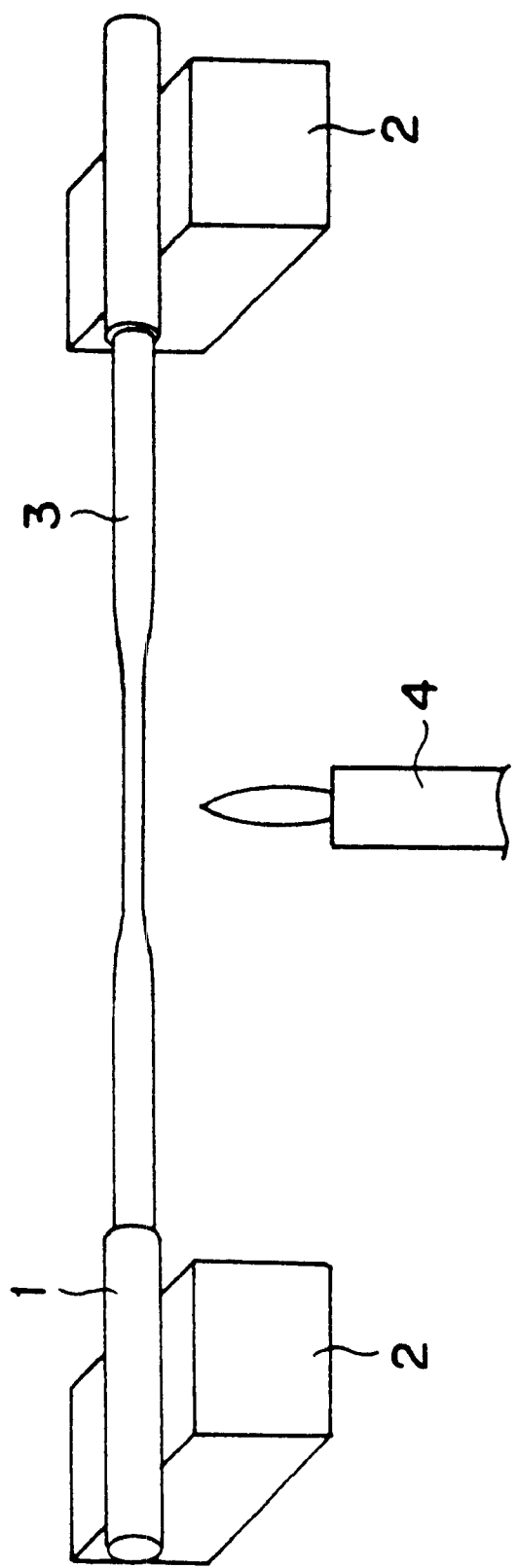
FIG. 30 is a view of a working concept illustrating an example of a method for fabricating a prior art optical fiber coupler together with FIGS. 29 and 31, in which an optical fiber strand is preliminarily drawn.
Figure 31:
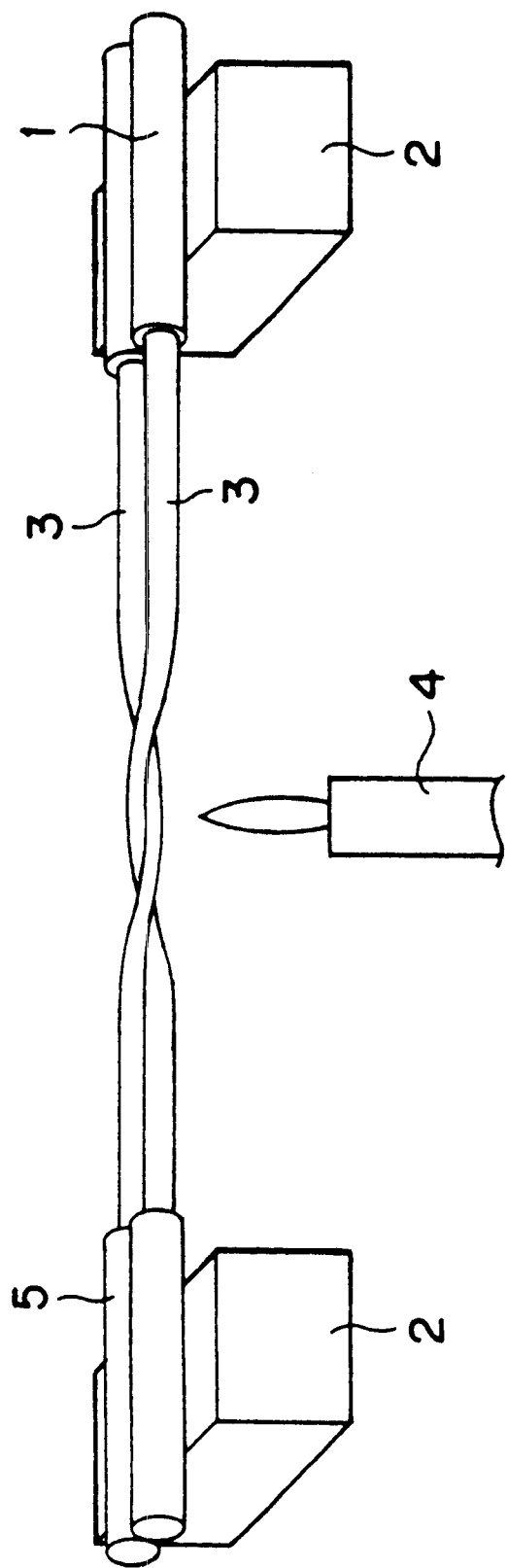
FIG. 31 is a view of a working concept illustrating an example of a method for fabricating a prior art optical fiber coupler together with FIGS. 29 and 30, ion which two twisted optical fibers are fixed.
Figure 32:
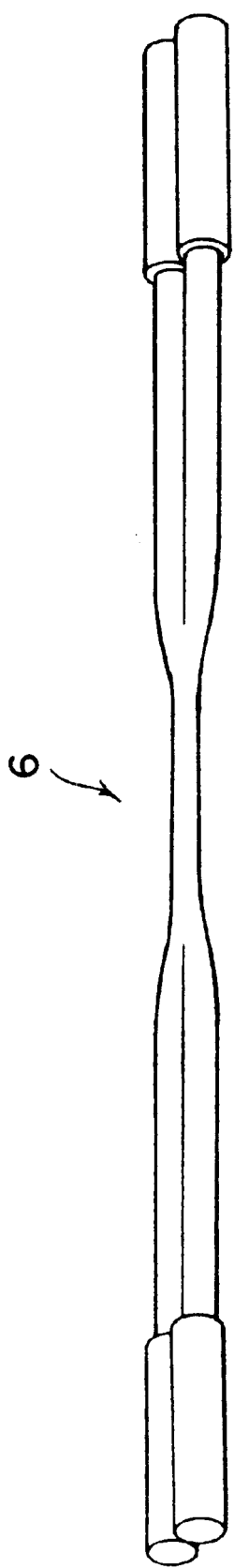
FIG. 32 is a perspective view illustrating an external appearance of an optical fiber coupler obtained by the method for fabricating a prior art optical fiber coupler illustrated in FIGS. 29 to 31.
Figure 33:
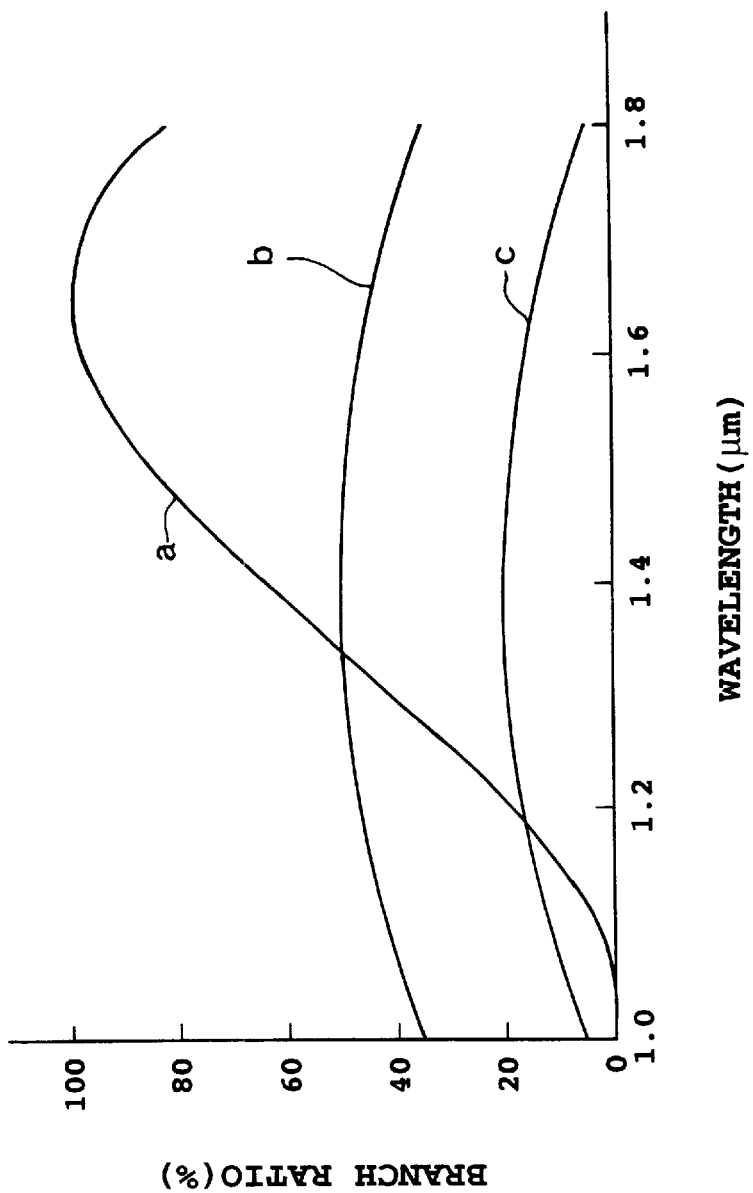
FIG. 33 is a graphical representation illustrating wavelength dependency of an optical branch ratio of a prior art symmetrical optical fiber coupler and an asymmetrical optical fiber coupler.
Figure 34:
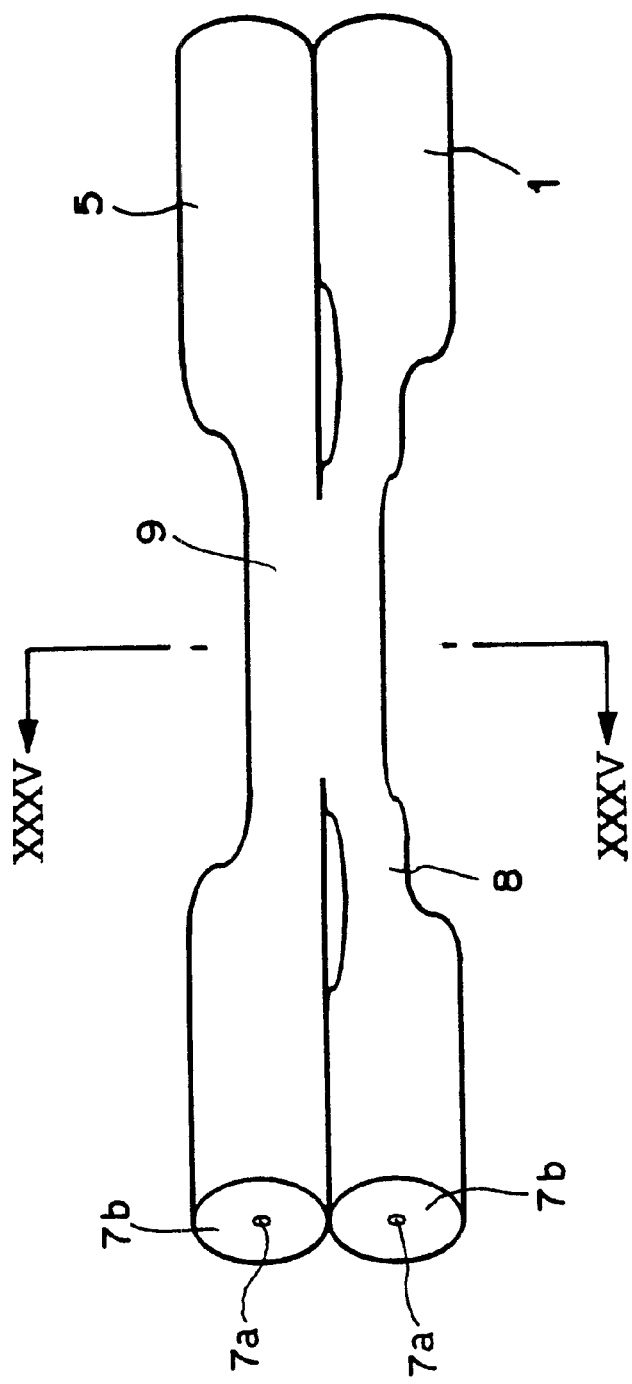
FIG. 34 is a view of a concept illustrating schematic construction of a prior art optical fiber coupler.
Figure 35:
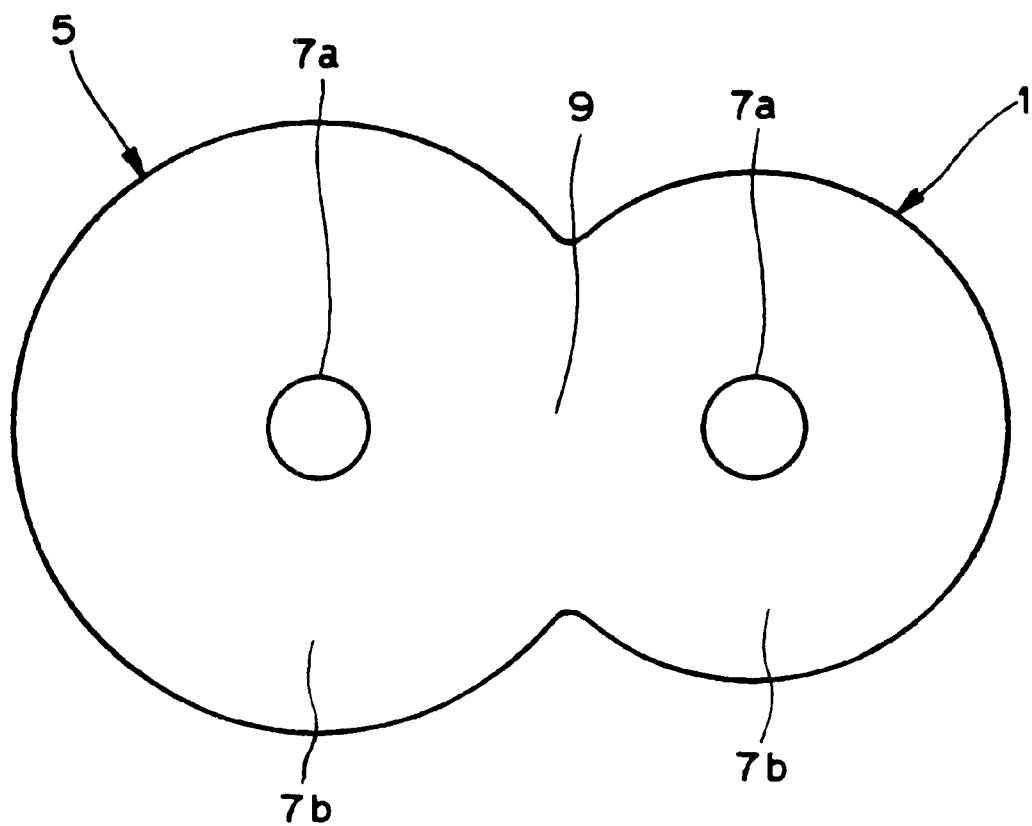
FIG. 35 is a cross sectional view viewed along a line XXXV—XXXV in FIG. 34.
Figure 36:
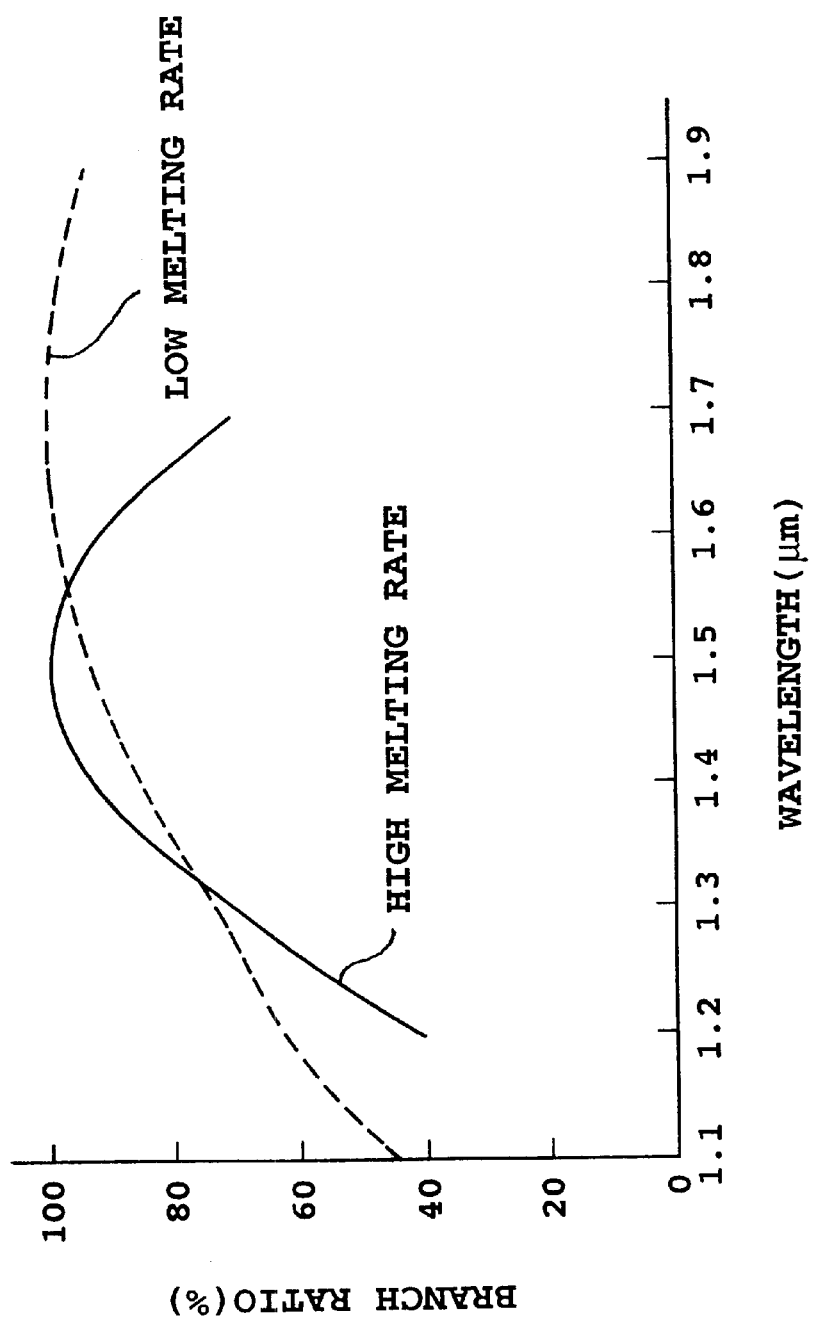
FIG. 36 is a graphical representation illustrating a relationship between a melting rate and a branch ratio of a symmetrical optical fiber coupler.

It is also possible to obtain an optical fiber coupler possessing different structural parameters such as the diameter of the core section, specific refractive index or cut-off frequency as in the previous embodiments even when the outer diameter of the clad section is same. For example, there is adopted an optical fiber coupler in which only the core diameter is altered concretely as the structural parameter, and the diameter of the core section of the one optical fiber is 6 µm and the diameter of the core section of the other optical fiber is 10 µm. Referring to FIG. 28, there is illustrated wavelength characteristic of an optical fiber coupler fabricated in such an embodiment. As illustrated in the FIG. 28, the branch ratio increases substantially monotonically in the wavelength range of from 1.1 µm to 1.7 µm, and the branch ratio falls within 4 to 9% in the wavelength range 1.3 to 1.55 µm (i.e. variations fall within 5%). It is therefore found that an optical fiber coupler can be fabricated without any trouble even when optical fibers possessing different structural parameters are combined.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical fiber coupler comprising:
    two optical fibers each including a core section for serving to transmit light and a clad section surrounding the former core section, the two optical fibers having similar structural parameters, the two optical fibers extending substantially parallel in a same flat plane; and
    a melting section where the clad sections of the two optical fibers are mutually melted substantially in linear contact.

2. The optical fiber coupler of claim 1, wherein the clad sections of the two optical fibers have substantially equal outer diameters.

3. The optical fiber coupler of claim 1, wherein a branch ratio increases substantially monotonically in response to a wavelength of light propagating in the optical fiber coupler, and in the range of the wavelength of the light from 1.3 to 1.55 µm the amount of a change in the branch ratio lies within 20%.

4. The optical fiber coupler of claim 1, wherein the optical fibers are configured such that the branch ratio is 1 to 20% when the range of the wavelength of light is from 1.3 to 1.55 µm.

5. An optical fiber coupler as claimed in claim 1 wherein a melting rate C represented by $$C=[1-\{W/(d_1+d_2)\}]\times 100$$

lies within 0.5 to 10%, preferably 1 to 7% where a maximum width size of said melting portion is assumed to be W, and outer diameters of said clad portions of said two optical fibers in the melting portion.

6. A method for fabricating an optical fiber coupler comprising the step of:
arranging mutually in parallel two optical fibers having similar structural parameters, each including a core portion serving to propagate light therethrough and a clad portion surrounding said core portion to bring at least parts of the clad portions into close contact;
mutually melting the parts of the dad portions of the two optical fibers substantially In a line contact state by heating the dad portions In a mutual dose contact state of said at least parts of said clad portions; and
heating and drawing said mutually melted two apical fibers.

7. The method of claim 6, wherein the step of mutually melting said dad portions of said two optical fibers further comprises a step of heating said clad portions to 1500° C. or higher.

8. The method for fabricating an optical fiber coupler as claimed in claim 6 or 7, wherein the step of heating and drawing of the two mutually melted optical fibers further comprises the steps of:
lowering a heating temperature with respect to the two optical fibers after those apical fibers are melted;
drawing melted portions of the two apical fibers when the heating temperature is lowered;
forcing monitor light to impinge from a one end side of any of said two apical fibers and detecting said monitor light from the other end side of at least one of said two apical fibers to measure a branch ratio thereof; and
interrupting the drawing of said melted portions of said two apical fibers at the time when said branch ratio reaches a predetermined value.

9. A method for fabricating an optical fiber coupler as claimed in claim 6, wherein when the maximum size of the width of a melted portion of said two optical fibers is assumed to be W, outer diameters of said clad portions of said two optical fibers assumed $d_1$ and $d_2$, a melting rate C represented by $$C=[1-\{W/(d_1+d_2)\}]\times 100$$

lies within a range of 0.5% to 100%, preferably 1 to 7%.

10. The method of claim 6, wherein the heating is achieved by use of an electric ceramic microheater.

11. The method of claim 6, wherein at least parts of the clad portions are substantially equal to each other.

12. The method of claim 6, further comprising the step of preliminarily drawing only one, of the two optical fibers to provide mutually different structural parameters.

13. The method of claim 6, further comprising the steps of arranging the two optical fibers mutually in parallel and preliminarily drawing only one of said two optical fibers to provide mutually different structural parameters thereof.

14. The method of claim 12, wherein the step of preliminarily drawing one optical fiber further comprises the steps of heating both optical fibers at a distortion elimination temperature or higher, and drawing only one of the heated optical fibers.

15. The method of claim 12, wherein step of preliminarily drawing one optical fiber is performed at such a heating temperature that the one optical fiber fails to melt with the other optical fiber.

16. An apparatus for fabricating an optical fiber coupler comprising:
a pair of fiber carrying blocks for holding longitudinally opposite sides of two optical fibers possessing similar structural parameters, the fiber carrying blocks movable along a longitudinal direction of the optical fibers;
a fiber fixing section provided on each fiber carrying block for fixing the two optical fibers to the fiber carrying blocks;
a base for carrying the pair of fiber carrying blocks;
carrying block drivers for opposingly moving the pair of fiber carrying blocks;
a fiber forcing rod provided on the fiber carrying blocks for forcing together the two optical fibers; and
a heater mounted on said base movable in a direction along a flat plane containing the two optical fibers for heating the two optical fibers.

17. The apparatus as claimed in claims 16, wherein said heater is an electric ceramic microheater.

18. An apparatus for fabricating an optical fiber coupler comprising:
a pair of first fiber carrying blocks for holding longitudinal opposite sides of a first optical fiber;
first fiber fixing means provided on the pair of the first fiber carrying blocks to fix said first optical fiber to said fiber carrying blocks;
a pair of second fiber carrying blocks for holding a second optical fiber at longitudinal opposite sides thereof in parallel with said first optical fiber;
second fiber fixing means provided on the pair of the second fiber carrying blocks for fixing said second optical fiber to said second fiber carrying blocks;
a base for movably carrying said first and second fiber carrying blocks longitudinally of said optical fiber;
first carrying block drive means for mutually oppositely moving said pair of the first fiber carrying blocks in opposite direction thereof;
second carrying block drive means for mutually oppositely moving said pair of the first fiber carrying blocks in the opposite direction thereof;
fiber biasing means provided on said first and second fiber carrying blocks for biasing said first and second optical fibers such that parts of portions of said first and second optical fibers where coatings thereof are removed make contact with each other;
a heater mounted movably in a direction intersecting a longitudinal direction of the optical fibers along a flat plane containing said first and second optical fibers for heating said first and second optical fibers; and
heater movement means for driving said heating means in the direction intersecting the longitudinal direction of these optical fibers along a flat plane containing said first and second optical fibers.

19. The apparatus as claimed in claim 18, wherein further includes a pair of coupling means for integrally coupling said first and second fiber carrying blocks located in close vicinity with each other.

20. The apparatus as claimed in claim 18, wherein said fiber biasing means includes a fixing pin fixed to any one of said first and second fiber carrying blocks, a plunger disposed on the opposite side to said fixing pin putting said first and second optical fibers therebetween and being movable in the opposite direction to said fixing pin, and plunger fixing means for fixing the plunger at a predetermined position located in the opposite direction to said fixing pin.

* * * * *

UNITED STATES PATENT AND TRADEMARK OFFICE
CERTIFICATE OF CORRECTION

PATENT NO. : 6,591,041 B2　　　　　　　　　　　　　　　　　　　Page 1 of 1
DATED : July 8, 2003
INVENTOR(S) : Satoru Tomaru et al.

It is certified that error appears in the above-identified patent and that said Letters Patent is hereby corrected as shown below:

Column 17,
Line 26, "dad portions" should read -- clad portions --.
Line 27, "In a line" should read -- in a line --.
Line 28, "dad portions In a mutual dose contact state" should read -- clad portions in a mutual close contact state --.
Line 30, "apical" should read -- optical --.
Line 33, "dad portions" should read -- clad portions --.
Lines 42, 43, 46, 48 and 50, "apical fibers" should read -- optical fibers --.

Signed and Sealed this

Eleventh Day of November, 2003

JAMES E. ROGAN
*Director of the United States Patent and Trademark Office*